(12) United States Patent
Wu et al.

(10) Patent No.: US 9,692,225 B2
(45) Date of Patent: *Jun. 27, 2017

(54) HYBRID DC BREAKER

(71) Applicant: Xi'an Jiaotong University, Xi'an, Shanxi (CN)

(72) Inventors: Yi Wu, Shanxi (CN); Mingzhe Rong, Shanxi (CN); Fei Yang, Shanxi (CN); Yifei Wu, Shanxi (CN); Hao Sun, Shanxi (CN); Chunping Niu, Shanxi (CN)

(73) Assignee: XI' AN JIAOTONG UNIVERSITY (CN)

( * ) Notice: Subject to any disclaimer, the term of this patent is extended or adjusted under 35 U.S.C. 154(b) by 77 days.

This patent is subject to a terminal disclaimer.

(21) Appl. No.: 14/157,777

(22) Filed: Jan. 17, 2014

(65) Prior Publication Data

US 2014/0376140 A1 Dec. 25, 2014

(30) Foreign Application Priority Data

Feb. 6, 2013 (CN) .......................... 2013 1 0049120

(51) Int. Cl.
*H02H 9/00* (2006.01)
*H02H 3/087* (2006.01)
*H01H 9/54* (2006.01)
*H01H 33/59* (2006.01)

(52) U.S. Cl.
CPC ............ *H02H 3/087* (2013.01); *H01H 9/548* (2013.01); *H01H 33/596* (2013.01)

(58) Field of Classification Search
CPC ........ H02H 3/087; H02H 9/005; H01H 9/548; H01H 33/596
USPC ........................................................ 361/100
See application file for complete search history.

(56) References Cited

U.S. PATENT DOCUMENTS

2012/0218676 A1* 8/2012 Demetriades et al. ....... 361/115

* cited by examiner

*Primary Examiner* — Thienvu Tran
*Assistant Examiner* — Kevin J Comber

(57) ABSTRACT

A hybrid DC breaker, comprises a main current circuit, a transfer current circuit, an over-voltage limiting circuit and a control system, wherein the main current circuit, the transfer current circuit and the over-voltage limiting circuit are connected in parallel. The transfer current circuit consists of circuits 1-4, wherein the circuit 1 and the circuit 4 are connected in series at first and then connected with the main current circuit in parallel; a pre-charged capacitor is connected with the circuit 4 in parallel after being connected with the circuit 3 in series; and, one end of the circuit 2 is connected with the left end of the main current circuit while the other end thereof is connected with a connection point of the pre-charged capacitor and the circuit 3.

9 Claims, 26 Drawing Sheets

HYBRID DC BREAKER

FIELD OF THE INVENTION

The present invention relates to a hybrid DC breaker, in particular to a hybrid DC breaker which limits, by controlling the timing sequence for the power semiconductor devices in a transfer current circuit to turn on in order to change the direction of current in the transfer current circuit, the rate of the over-voltage rise at two ends of a breaker when the breaker breaks.

BACKGROUND OF THE INVENTION

Hybrid DC breakers consisting of high-speed mechanical switches and large-power semiconductor devices, with advantages of large discharge current capacity, high turn-off speed, high current limitation and the like, have become a research hotspot in the field of DC breaking. To limit and break a short-circuit current with a high rate of rise, a hybrid DC breaker must be rapid in response and reliable in action so as to turn off the fault circuit at an early stage of a short-circuit fault. Generally, the power semiconductor device acts very quickly, so the response speed of the mechanical switch becomes a bottleneck that restricts the breaking performance of a hybrid breaker. Meanwhile, there will be a transient over-voltage greater than the system voltage at two ends of the mechanical switch when a hybrid DC breaker cuts off a short-circuit current, so higher requirements have been proposed to the design of the control systems of hybrid breakers. By adjusting the topology of the transfer current circuit to control the rate of the over-voltage rise at the two ends in the case of short-circuit, the clearance between the contacts of the mechanical switch is allowed to withstand a voltage generated excessively in the breaking process, so that reliable breaking is ensured.

SUMMARY OF THE INVENTION

With regard to the above deficiencies or shortcomings of the prior art, an object of the present invention is to provide a hybrid DC breaker and a control method thereof. By controlling the power semiconductor devices in the transfer current circuit to turn on according to a certain timing sequence, the rate of the over-voltage rise at two ends of the breaker can be limited effectively; furthermore, as the capacitive current undergoes two times of transfer when the breaker breaks, the direction of the voltage on the pre-charged capacitor is consistent to the direction of the pre-charged voltage before action after the breaker breaks, so that the charge of the capacitor C is omitted.

When the voltage at two ends of the transfer current circuit reaches the turn-on threshold of the over-voltage limiting circuit, the over-voltage limiting circuit is turned on so that voltage at two ends of the main current circuit is limited within a certain range. A control system monitors the current amplitude and current rate of change of both the main current circuit and the circuit 1 in the transfer current circuit, and controls a high-speed mechanical switch and the transfer current circuit to act in a certain timing sequence according to the monitoring results.

Specifically, the following technical solutions are employed in the present invention.

A hybrid DC breaker is provided, comprising a main current circuit, a transfer current circuit, an over-voltage limiting circuit, a control system, and an access terminal S1 and an access terminal S2 of the system, the main current circuit, the transfer current circuit and the over-voltage limiting circuit being connected in parallel, wherein:

(1) the main current circuit consists of a high-speed mechanical switch and a power semiconductor device A0, which are connected in series, wherein: the access terminal S1 is connected with one end of the high-speed mechanical switch to realize the connection of the access terminal S1 with one end of the main current circuit; the other end of the high-speed mechanical switch is connected with one end of the power semiconductor device A0; and the other end of the power semiconductor device A0 is connected with the access terminal S2 to realize the connection of the access terminal S2 with the other end of the main current circuit;

(2) the transfer current circuit comprises a circuit 1 consisting of a power semiconductor device A1, a circuit 2 consisting of an inductor L_0 and a power semiconductor device A2 connected in series, a circuit 3 consisting of an inductor L_1 and a power semiconductor device A3 connected in series, a circuit 4 consisting of a power semiconductor device A4, and a pre-charged capacitor C pre-charged with a certain voltage, the circuit 1 being connected with the circuit 4 in series, the circuit 2 being connected with the circuit 3 in series, wherein:

(A) the circuit 1 is connected with the circuit 4 in series to form a branch 14 of the transfer current circuit, and the branch 14 is connected with the main current circuit in parallel, furthermore: the access terminal S1 is connected with one end of the power semiconductor device A1 to realize the connection with one end of the branch 14; the other end of the power semiconductor device A1 is connected with one end of the power semiconductor device A4 to realize the connection in series of the circuit 1 with the circuit 4; and the other end of the power semiconductor device A4 is connected with the access terminal S2 to realize the connection of the other end of the branch 14 with the access terminal S2, in order to realize the connection in parallel of the branch 14 with the main current circuit;

(B) the circuit 2 is connected with the circuit 3 in series to form a branch 23 of the transfer current circuit, and the branch 23 is connected with the main current circuit in parallel, furthermore: the access terminal S1 is connected with one end of the inductor L_0 to realize connection with one end of the branch 23; the other end of the inductor L_0 is connected with one end of the power semiconductor device A2; the other end of the power semiconductor device A2 is connected with one end of the inductor L_1 to realize the connection in series of the circuit 2 with the circuit 3; the other end of the inductor L_1 is connected with one end of the power semiconductor device A3; and the other end of the power semiconductor device A3 is connected with the access terminal S2 to realize the connection of the other end of the branch 23 with the access terminal S2, in order to realize the connection in parallel of the branch 23 with the main current circuit; and (C) the pre-charged capacitor C is connected between an endpoint between the circuit 1 and the circuit 4 and an endpoint between the circuit 2 and the circuit 3; and (3) the control system measures the current flowing through the access terminal S1 or S2, the current flowing through the main current circuit, the current flowing through the circuit 1 in the transfer current circuit, the current flowing through the over-voltage limiting circuit, the voltage at two ends of the high-speed mechanical switch and the displacement of the high-speed mechanical switch, and controls the high-speed mechanical switch and the power semiconductor devices A1-A4 in the transfer current circuit to act by measuring the current amplitude and current rate of change of the main current circuit and the current amplitude and current rate of change of the circuit 1 in the transfer current circuit.

Wherein, in a normal operating state, current flows through the main current circuit, and the pre-charged capacitor C is pre-charged with a certain voltage, the direction of the voltage being opposite to the direction of a turn-on voltage drop of the main current circuit; at this moment, the circuits 1-4 in the transfer current circuit are all turned off, so that no current flows through the transfer current circuit and also no current flows through the over-voltage limiting circuit; and when the system needs to break, the control system first controls the high-speed mechanical switch in the main current circuit to perform an opening action, however, at this moment, the contact of the high-speed mechanical switch is still closed as the high-speed mechanical switch has a mechanical time delay; and then, the control system determines whether the power semiconductor devices A1-A4 in the transfer current circuit to act or not and a corresponding timing sequence for action by measuring the current amplitude and current rate of change of the main current circuit and the current amplitude and current rate of change of the circuit 1 in the transfer current circuit.

Wherein, the control system comprises a current sensor T0 for measuring the current flowing through the access terminal S1 or S2, a current sensor T1 for measuring the current flowing through the main current circuit, a current sensor T2 for measuring the current flowing through the circuit 1 in the transfer current circuit, a current sensor T3 for measuring the current flowing through the over-voltage limiting circuit, a sensor V for measuring the voltage at two ends of the high-speed mechanical switch, and a sensor P for measuring the displacement of the high-speed mechanical switch, as well as a signal conditioning circuit, a high-speed AD, a processor and a human-computer interface, the processor calculating the amplitude and rate of change di/dt of the current flowing through the system, the main current circuit and the circuit 1, the human-computer interface displaying the state of the hybrid DC breaker and the results of calculation in real time.

Wherein, the high-speed mechanical switch is a high-speed mechanical switch based on electromagnetic repulsion, a mechanical switch driven by a high-speed motor or a high-speed mechanical switch driven by explosion.

Wherein, the power semiconductor devices A0 and A2 are power semiconductor devices with a single-way turn-on function or combinations thereof; and, the power semiconductor devices A1, A3 and A4 are power semiconductor devices with a single-way turn-on function and a half-controlled function or combinations thereof, and the power semiconductor devices with a half-controlled function include, but are not limited to, any one or combinations of more of a transistor, an IGCT, an IGBT and a GTO.

However, according to different breaking ways of breakers, one or more of the power semiconductor devices A0-A4 are full-controlled devices.

Wherein, the over-voltage limiting circuit is turned-off in the case that the breaker operates normally, the leakage current being less than 1 μA; and the turn-on voltage threshold of the over-voltage limiting circuit is 1.5 times of the voltage of the system with the breaker.

Wherein, the over-voltage limiting circuit comprises one or combinations of more of a varistor, an MOV consisting of zinc oxide varistors, or an arrester.

Wherein, the design parameters of the over-voltage limiting circuit comprise capacity of the over-voltage limiting circuit, turn-on voltage threshold, current when the turn-on voltage is reached, the highest clamp voltage, and current when the highest clamp voltage is reached.

BRIEF DESCRIPTION OF THE DRAWINGS

FIG. 12(a) to FIG. 12 (d) are a view of the flow direction of current of the transfer current circuit when the breaking current is less than or equal to the rated current.

DETAILED DESCRIPTION OF THE INVENTION

The specific embodiments of the present invention will be described as below with reference to the drawings.

Figure 1:
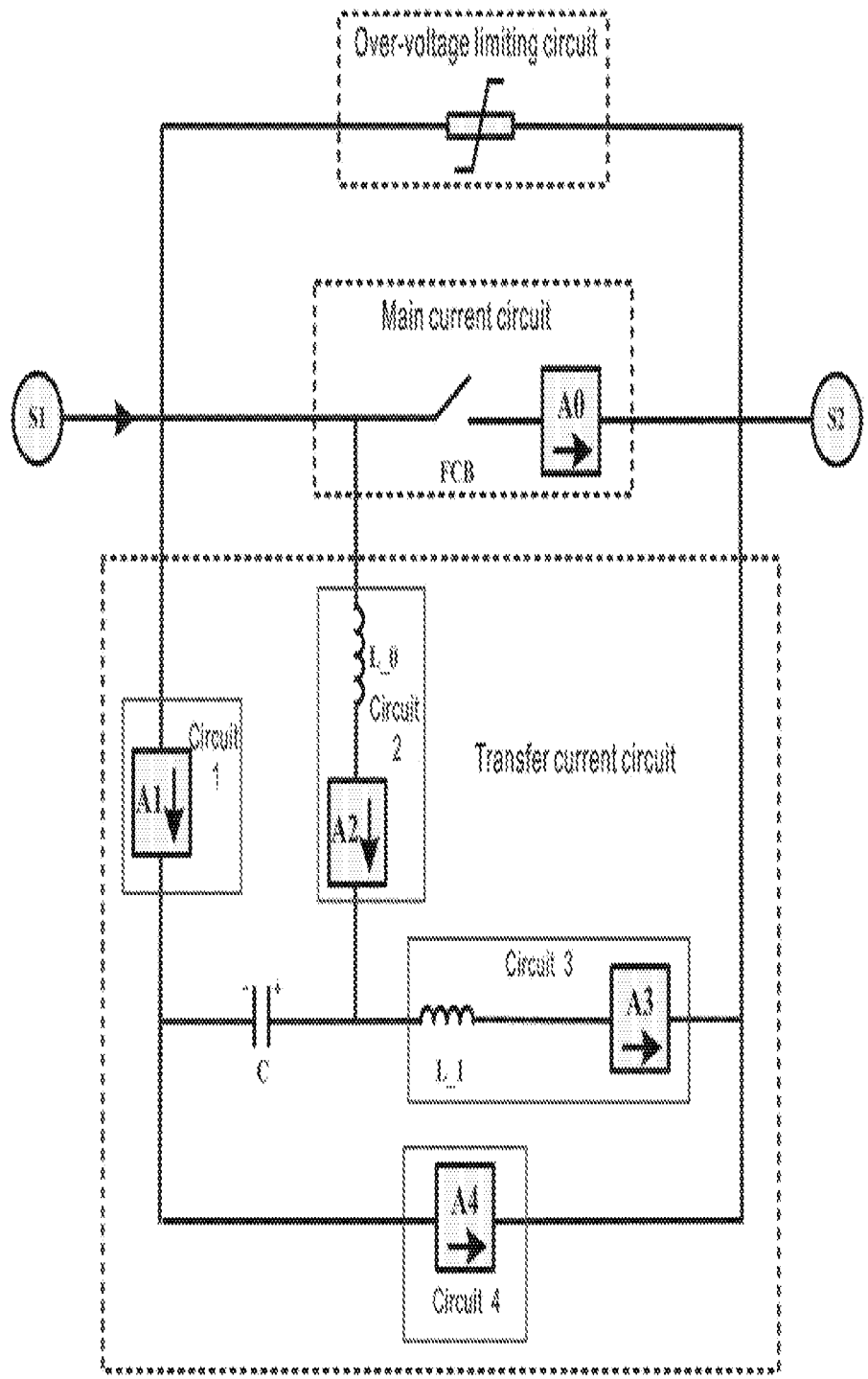
FIG. 1 is a structure diagram of a breaker main body.
Figure 2:
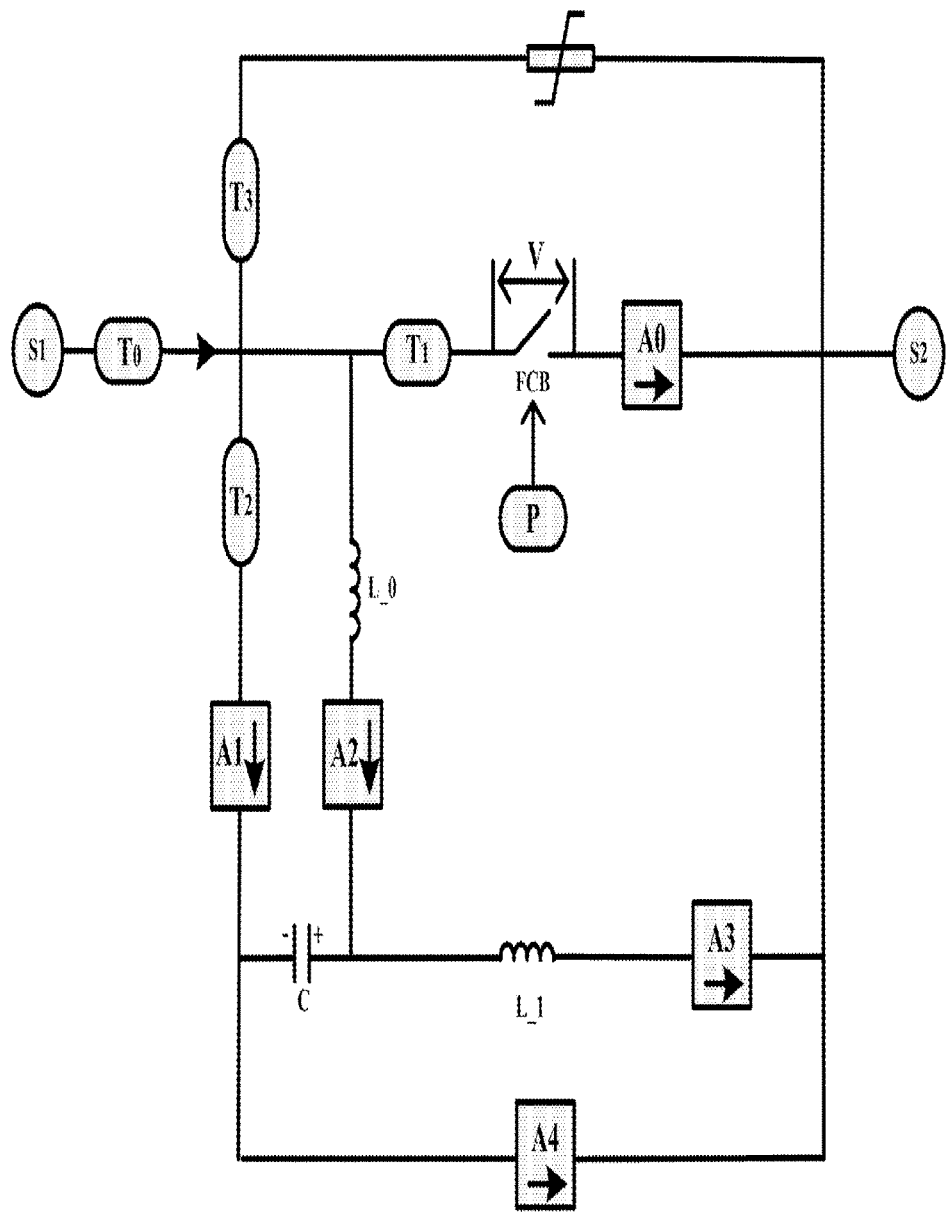
FIG. 2 is a distribution diagram of sensors of a control system.
Figure 3:
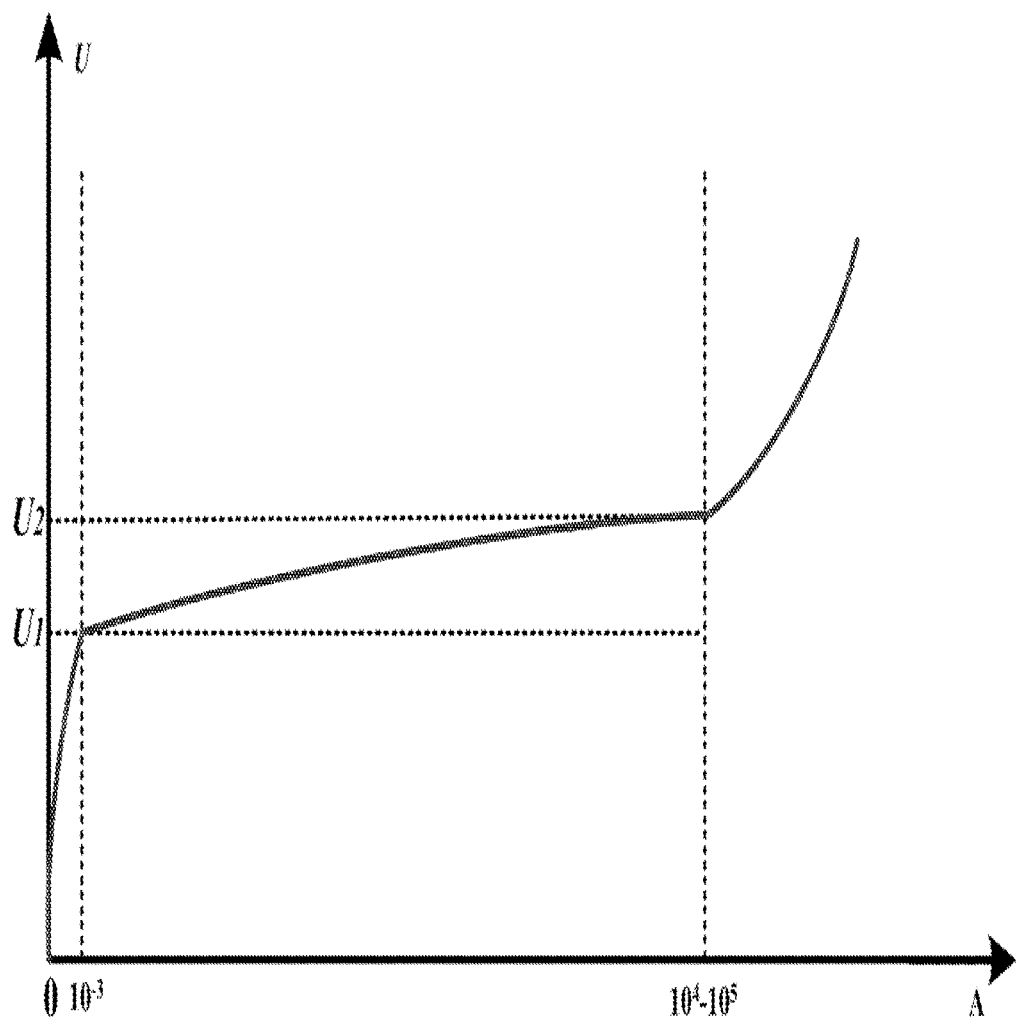
FIG. 3 is a volt-ampere characteristic graph of an over-voltage limiting circuit.
Figure 19:
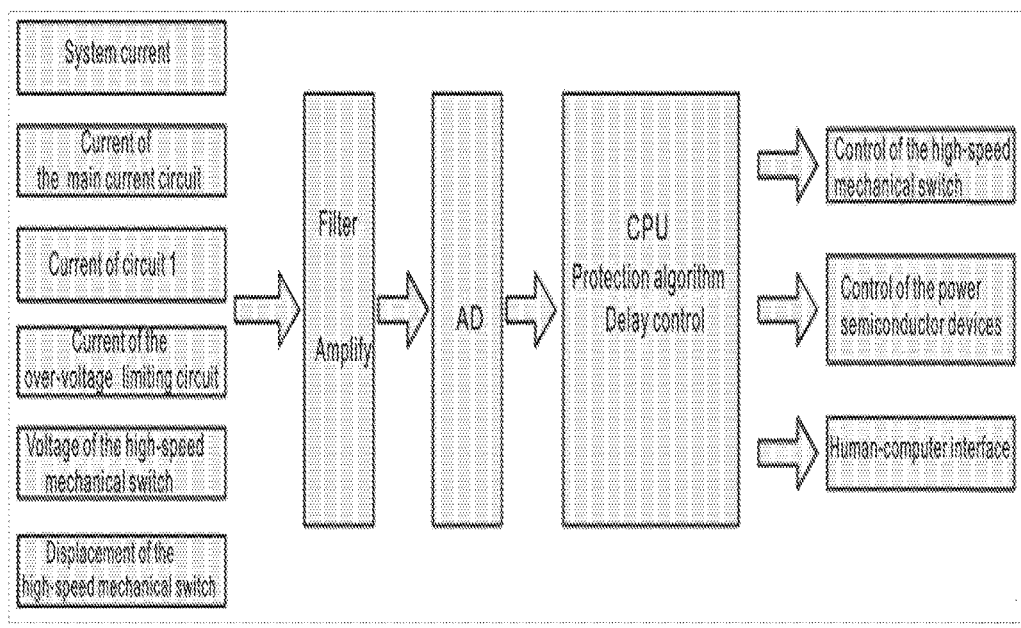
FIG. 19 is a block diagram of a control system.

FIG. 1 is a structure diagram of a breaker main body comprising a main current circuit, a transfer current circuit and an over-voltage limiting circuit. FIG. 2 is a distribution diagram of sensors of a control system in the hybrid breaker. FIG. 3 shows a volt-ampere characteristic curve of the over-voltage limiting circuit. FIG. 19 is a block diagram of the control system.

Referring to FIG. 1, a hybrid DC breaker is disclosed, comprising a main current circuit, a transfer current circuit, an over-voltage limiting circuit, a control system, and an access terminal S1 and an access terminal S2 of the system. The main current circuit, the transfer current circuit and the over-voltage limiting circuit are connected in parallel.

The main current circuit consists of a high-speed mechanical switch and a power semiconductor device A0, which are connected in series, wherein: the access terminal S1 is connected with one end of the high-speed mechanical switch to realize the connection of the access terminal S1 with one end of the main current circuit; the other end of the high-speed mechanical switch is connected with one end of the power semiconductor device A0; and the other end of the power semiconductor device A0 is connected with the access terminal S2 to realize the connection of the access terminal S2 with the other end of the main current circuit.

The transfer current circuit comprises a circuit 1 consisting of a power semiconductor device A1, a circuit 2 consisting of an inductor L_0 and a power semiconductor device A2 connected in series, a circuit 3 consisting of an inductor L_1 and a power semiconductor device A3 connected in series, a circuit 4 consisting of a power semiconductor device A4, and a pre-charged capacitor C pre-charged with a certain voltage. The circuit 1 is connected with the circuit 4 in series, while the circuit 2 is connected with the circuit 3 in series.

Wherein: the circuit 1 is connected with the circuit 4 in series to form a branch 14 of the transfer current circuit, and the branch 14 is connected with the main current circuit in parallel; furthermore: the access terminal S1 is connected with one end of the power semiconductor device A1 to realize the connection with one end of the branch 14; the other end of the power semiconductor device A1 is connected with one end of the power semiconductor device A4 to realize the connection in series of the circuit 1 with the circuit 4; and the other end of the power semiconductor device A4 is connected with the access terminal S2 to realize the connection of the other end of the branch 14 with the access terminal S2, in order to realize the connection in parallel of the branch 14 with the main current circuit.

The circuit 2 is connected with the circuit 3 in series to form a branch 23 of the transfer current circuit, and the branch 23 is connected with the main current circuit in parallel; furthermore: the access terminal S1 is connected with one end of the inductor L_0 to realize connection with one end of the branch 23; the other end of the inductor L_0 is connected with one end of the power semiconductor device A2; the other end of the power semiconductor device A2 is connected with one end of the inductor L_1 to realize the connection in series of the circuit 2 with the circuit 3; the other end of the inductor L_1 is connected with one end of the power semiconductor device A3; and the other end of the power semiconductor device A3 is connected with the access terminal S2 to realize the connection of the other end of the branch 23 with the access terminal S2, in order to realize the connection in parallel of the branch 23 with the main current circuit.

The pre-charged capacitor C is connected between an endpoint between the circuit 1 and the circuit 4 and an endpoint between the circuit 2 and the circuit 3.

The control system measures the current flowing through the access terminal S1 or S2, the current flowing through the main current circuit, the current flowing through the circuit 1 in the transfer current circuit, the current flowing through the over-voltage limiting circuit, the voltage at two ends of the high-speed mechanical switch and the displacement of the high-speed mechanical switch, and controls the high-speed mechanical switch and the power semiconductor devices A1-A4 in the transfer current circuit to act by measuring the current amplitude and current rate of change of the main current circuit and the current amplitude and current rate of change of the circuit 1 in the transfer current circuit.

Wherein, the power semiconductor devices A0 and A2 are power semiconductor devices with a single-way turn-on function or combinations thereof; and, the power semiconductor devices A1, A3 and A4 are power semiconductor devices with a single-way turn-on function and a half-controlled function or combinations thereof. The power semiconductor devices with a half-controlled function include, but are not limited to, any one or combinations of more of a transistor, an IGCT, an IGBT and a GTO. Understandably, both the half-controlled devices and the full-controlled devices have a half-controlled function.

Wherein, according to different breaking ways of breakers, one or more of the power semiconductor devices A0-A4 are full-controlled devices.

Wherein, the high-speed mechanical switch is any one of a high-speed mechanical switch based on electromagnetic repulsion, a mechanical switch driven by a high-speed motor or a high-speed mechanical switch driven by explosion.

The over-voltage limiting circuit comprises one or combinations of more of a varistor, an MOV consisting of zinc oxide varistors, or an arrester.

Referring to FIG. 2 and FIG. 19, the control system comprises a current sensor T0 for measuring the current flowing through the access terminal S1 or S2, a current sensor T1 for measuring the current flowing through the main current circuit, a current sensor T2 for measuring the current flowing through the circuit 1 in the transfer current circuit, a current sensor T3 for measuring the current flowing through the over-voltage limiting circuit, a sensor V for measuring the voltage at two ends of the high-speed mechanical switch, and a sensor P for measuring the displacement of the high-speed mechanical switch, as well as a signal conditioning circuit, a high-speed AD, a processor and a human-computer interface. The processor calculates the amplitude and rate of change di/dt of the current flowing through the system, the main current circuit and the circuit 1. The human-computer interface displays the state of the hybrid DC breaker and the results of calculation in real time.

1. The Access Process of the Hybrid Breaker

Figure 4:
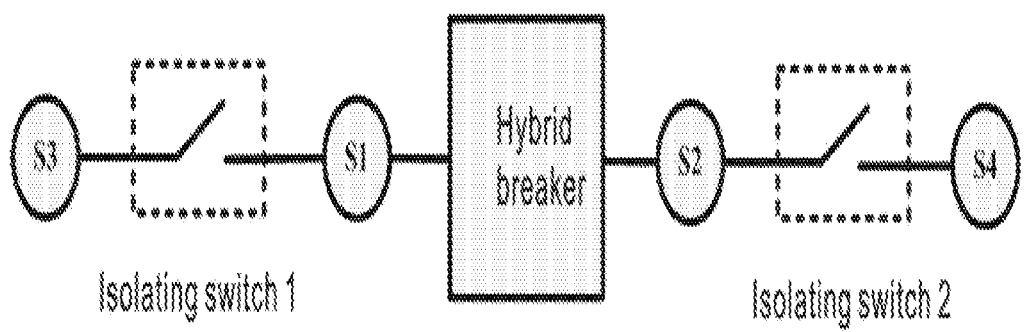
FIG. 4 is a structure diagram of the access process of a hybrid breaker.

FIG. 4 shows a structure diagram of the access process of the hybrid breaker. Wherein, S1, S2 and S3 are all access terminals of the system. Isolating switches are devices required when the breaker accesses to the system. The system may be any system to which the breaker is to be applied, beyond the scope of the present invention.

The access process of the hybrid breaker of the present invention is divided into the following steps:

1) The hybrid breaker is connected to the access terminals S1 and S2 of a system in the case that the isolating switch 1 and the isolating switch 2 are turned off. The contacts of the high-speed mechanical switch are turned off during the access.

2) The isolating switch 1 and the isolating switch 2 are turned on. At this moment, all power semiconductor devices of the hybrid breaker are off, and there is a system voltage at two ends of the hybrid breaker.

3) The power semiconductor devices A1 and A4 in FIG. 1 are controlled to turn on, thus the voltage at two ends of the hybrid breaker is limited by the turn-on voltage drop of the power semiconductor devices. At this moment, the current in the hybrid breaker all flows through the branch 14 of the transfer current circuit.

4) The high-speed mechanical switch is controlled to switch on. As the voltage power at two ends of the high-speed switch is equal to the turn-on voltage drop of the power semiconductor devices and the voltage is low, no electric arc will be generated during the closing process.

5) After high-speed mechanical switch is switched on, the current flowing through A1 and A4 transfers to the main current circuit rapidly as the voltage at two ends of the main current circuit is less than that at two ends of the branch 14 of the transfer current circuit. After the current all transfers to the main current circuit, the power semiconductor devices A1 and A4 will turn off automatically.

So far, the access process of the hybrid breaker has been completed, and the hybrid breaker starts to operate normally.

2. Turn-on and Turn-Off Processes of the Over-Voltage Limiting Circuit

FIG. 3 shows a volt-ampere characteristic curve of the over-voltage limiting circuit, where, U1 is the turn-on threshold voltage of the over-voltage limiting circuit, and U2 is the highest voltage with voltage clamp action of the over-voltage limiting circuit. When the voltage at two ends of the over-voltage limiting circuit is less than U1, the over-voltage limiting circuit is turned off, and the leakage current of the over-voltage limiting circuit is far less than 1 mA. That is, the over-voltage limiting circuit is turned off. After the voltage at two ends of the over-voltage limiting circuit reaches the turn-on threshold, the voltage at two ends of the over-voltage limiting circuit changes little with the sharp increase of the current. The design parameters of the over-voltage limiting circuit comprise capacity (absorbed energy) of the over-voltage limiting circuit, turn-on voltage threshold, current when the turn-on voltage is reached, the highest clamp voltage, and current when the highest clamp voltage is reached. When the current is greater than the current at the highest clamp voltage, the over-voltage limiting circuit will fails in the voltage clamp action. That is, the over-voltage limiting action will be failed. Usually, the turn-on threshold of the over-voltage limiting circuit is 1.5 times of the voltage in the normal operating state. That is, after the over-voltage limiting circuit is turned on, due to the voltage clamp action of the over-voltage limiting circuit, the voltage at the two ends is higher than the system voltage when there is current (greater than 1 mA) in the over-voltage limiting circuit, and the over-voltage limiting circuit will be turned off until the system current is less than 1 mA.

Figure 5:
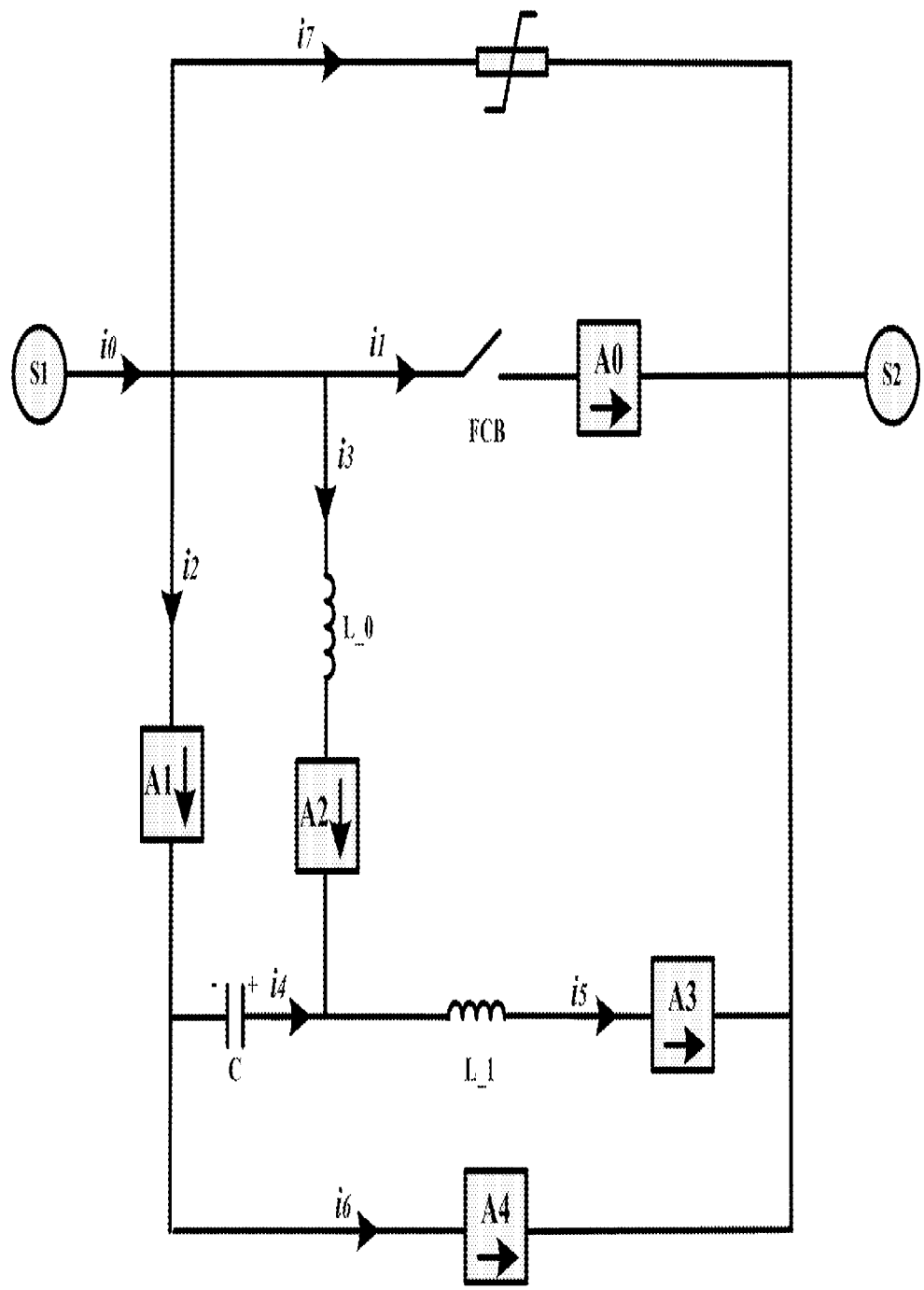
FIG. 5 is a schematic diagram of current flags of the transfer current circuit when the breaking current is greater than the rated current.

3. The Breaking Process of the Hybrid Breaker (1) In the Case that the Breaking Current is Greater than the Rated Current FIG. 5 shows current flags of each branch of the transfer current circuit when the breaking current is greater than the rated current, where, i0 is the current flowing through the access terminal S1 or S2, i1 is the current flowing through the main current circuit, i2 is the current flowing through the circuit 1, i3 is the current flowing through the circuit 2, i4 is the current flowing through the pre-charged capacitor C, i5 is the current flowing through the circuit 3, i6 is the current flowing through the circuit 4, and i7 is the current flowing the over-voltage limiting circuit.

Figure 6:
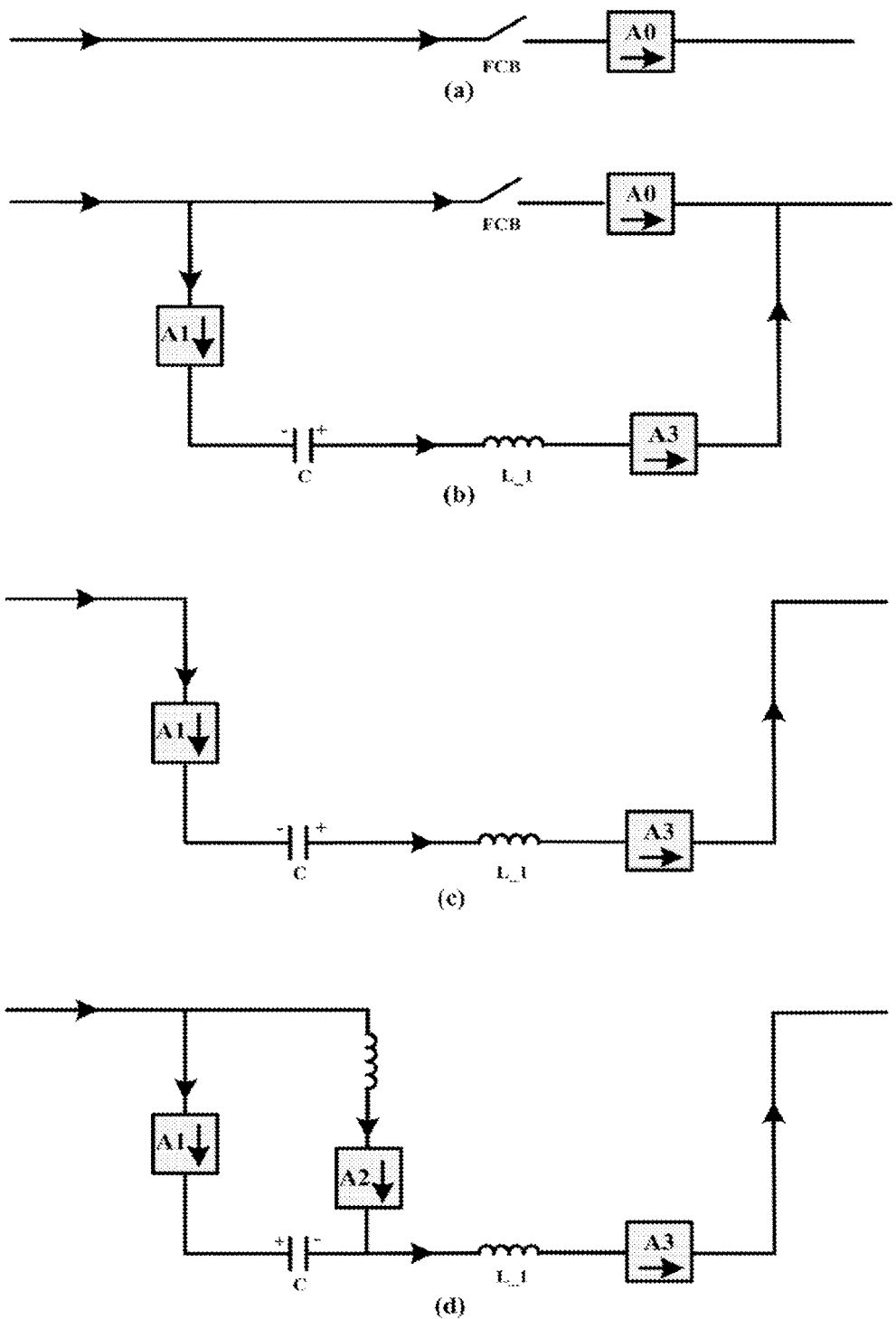
FIG. 6 (a) to FIG. 6 (i) are a view of the flow direction of current of the transfer current circuit when the breaking current is greater than the rated current.
Figure 6:
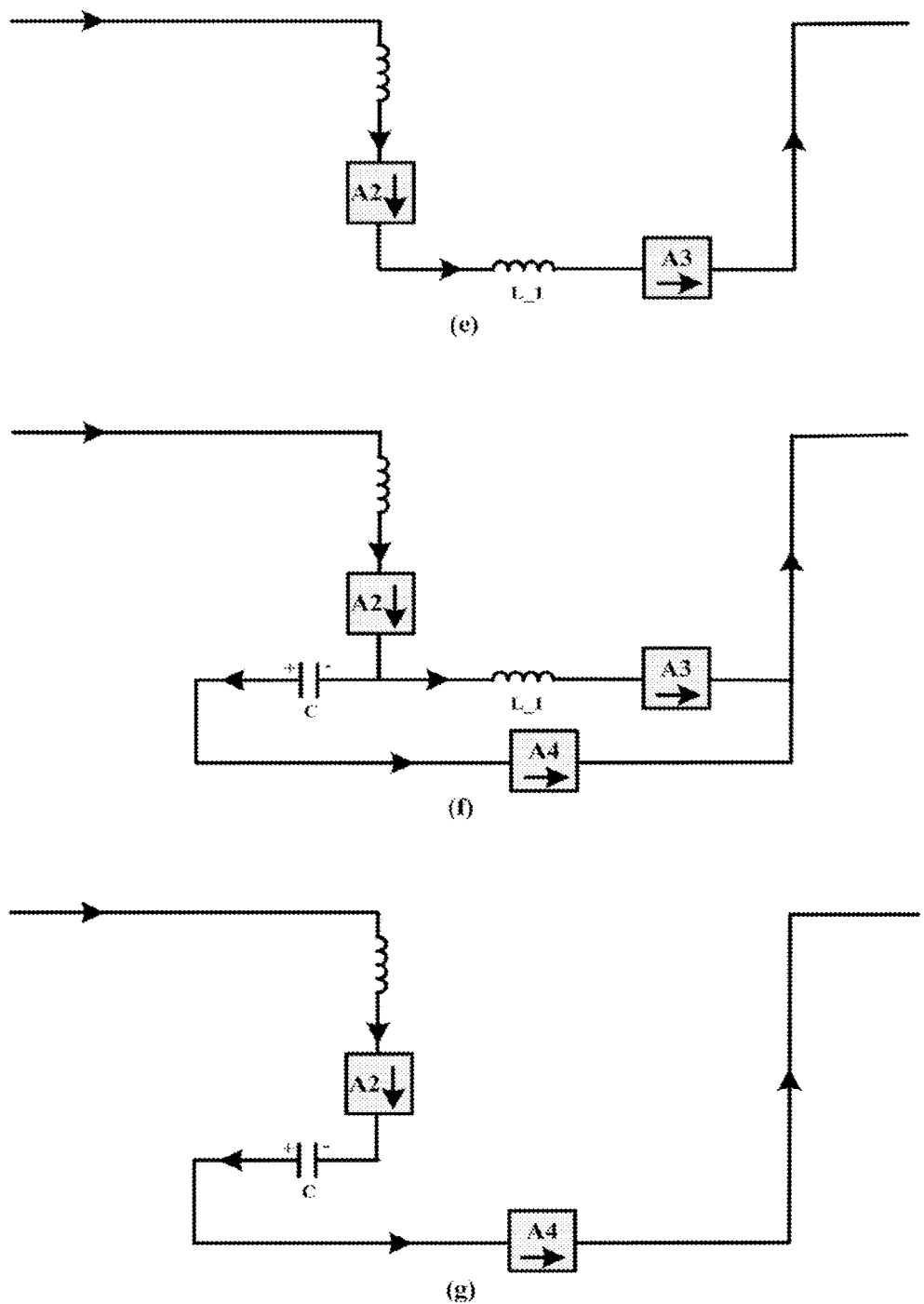
Figure 6:
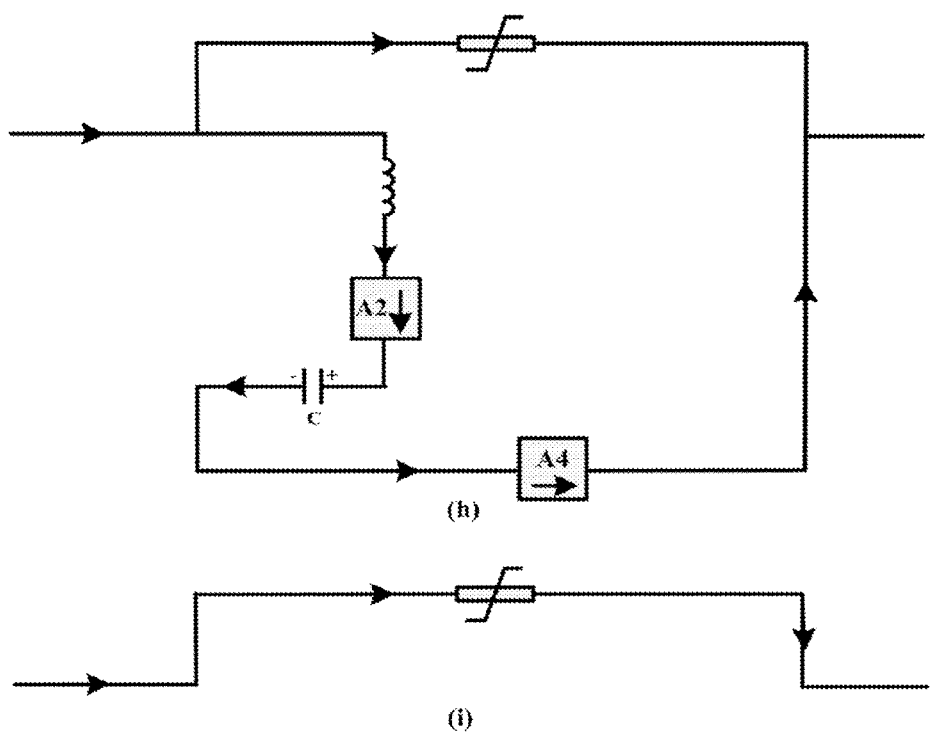
Figure 7:
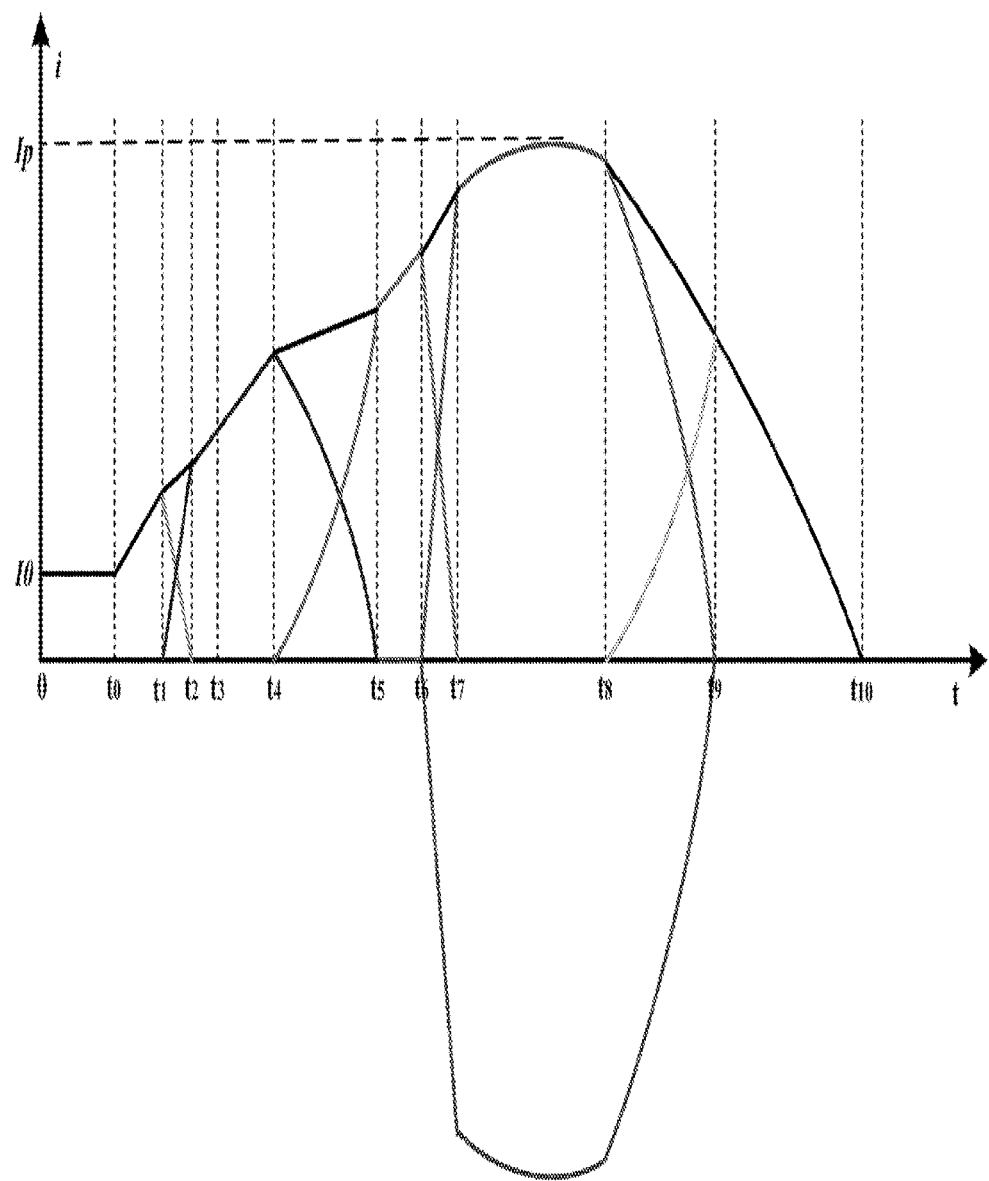
FIG. 7 is a view after overlapping all current change curves when the breaking current is greater than the rated current.
Figure 8:
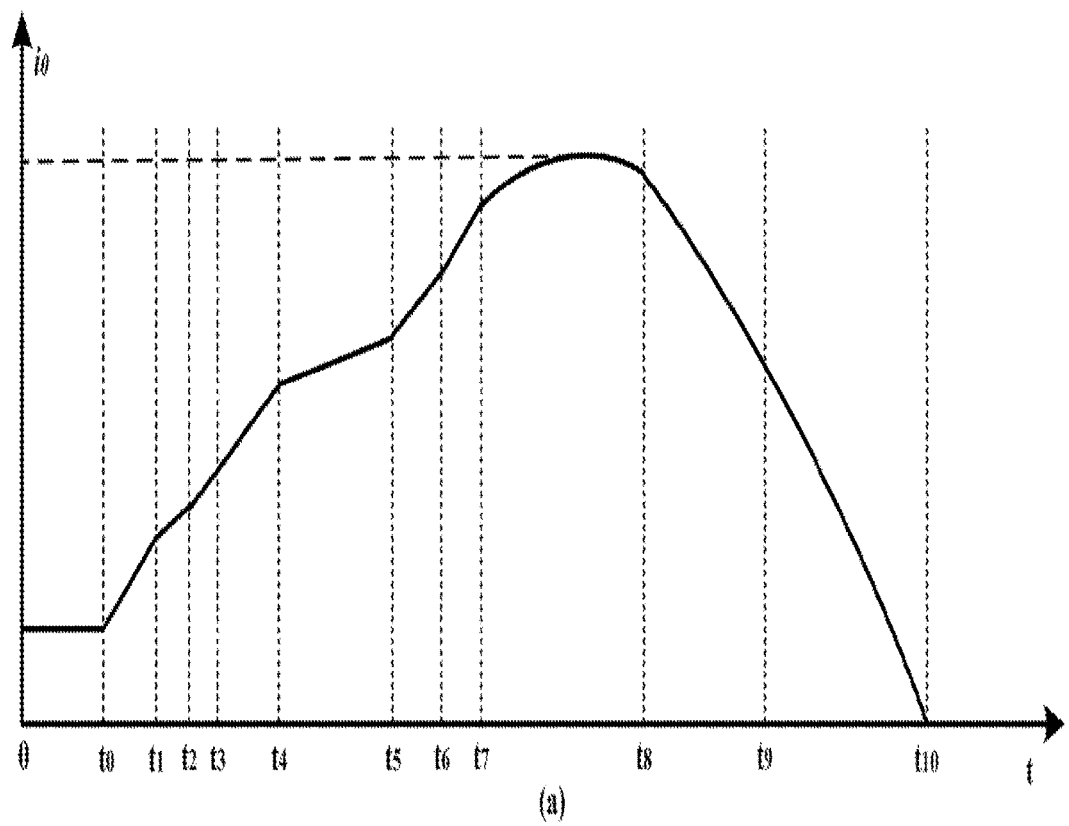
FIG. 8 (a) to FIG. 8 (h) are a current change graph of the transfer current circuit, corresponding to FIG. 7, when the breaking current is greater than the rated current.
Figure 8:
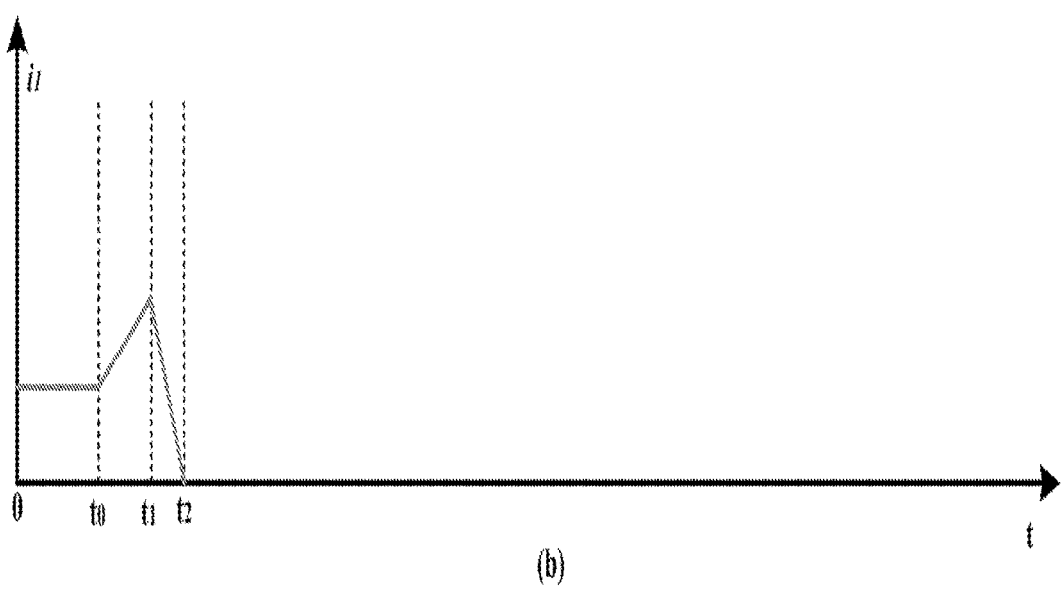
Figure 8:
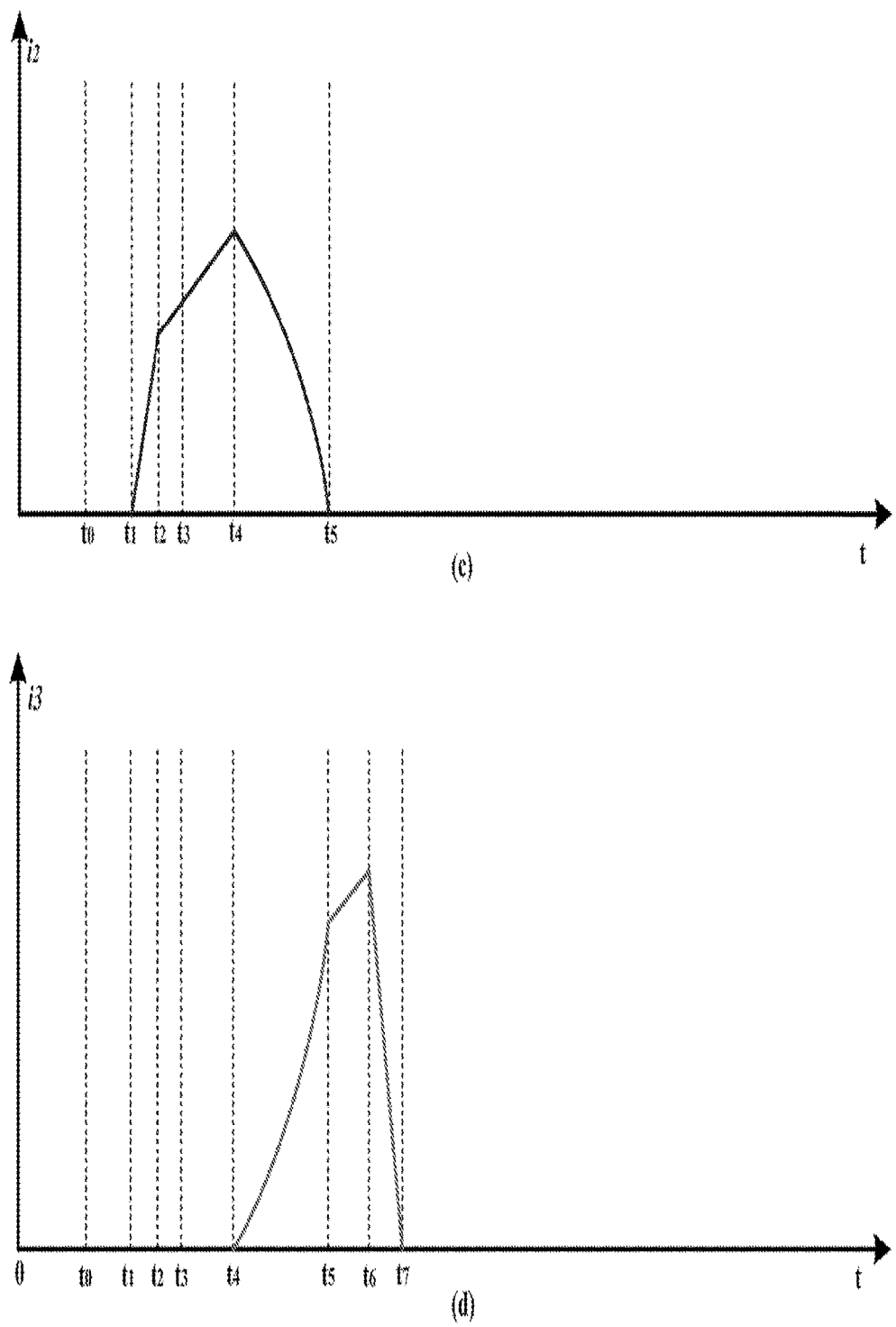
Figure 8:
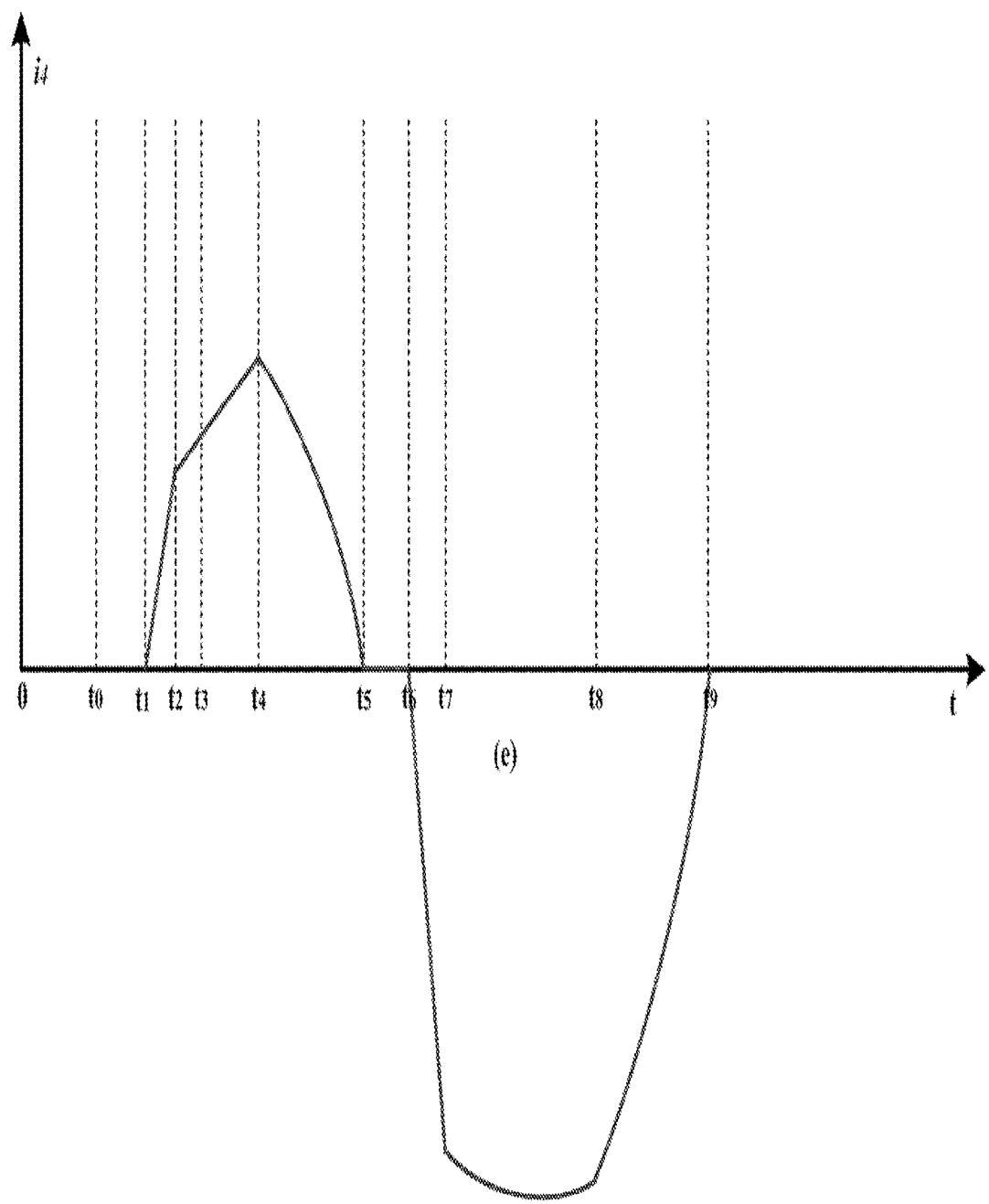
Figure 8:
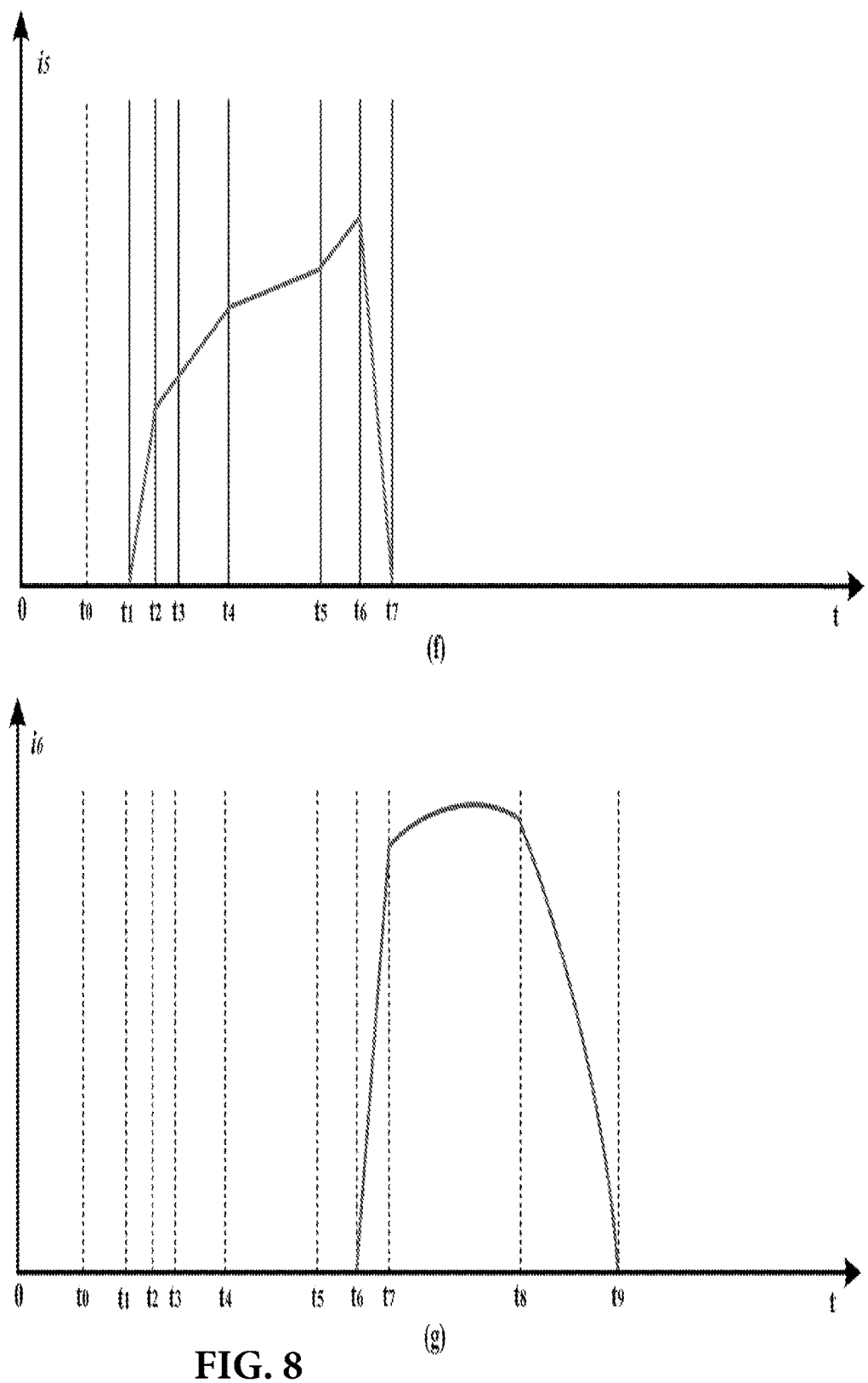
Figure 8:
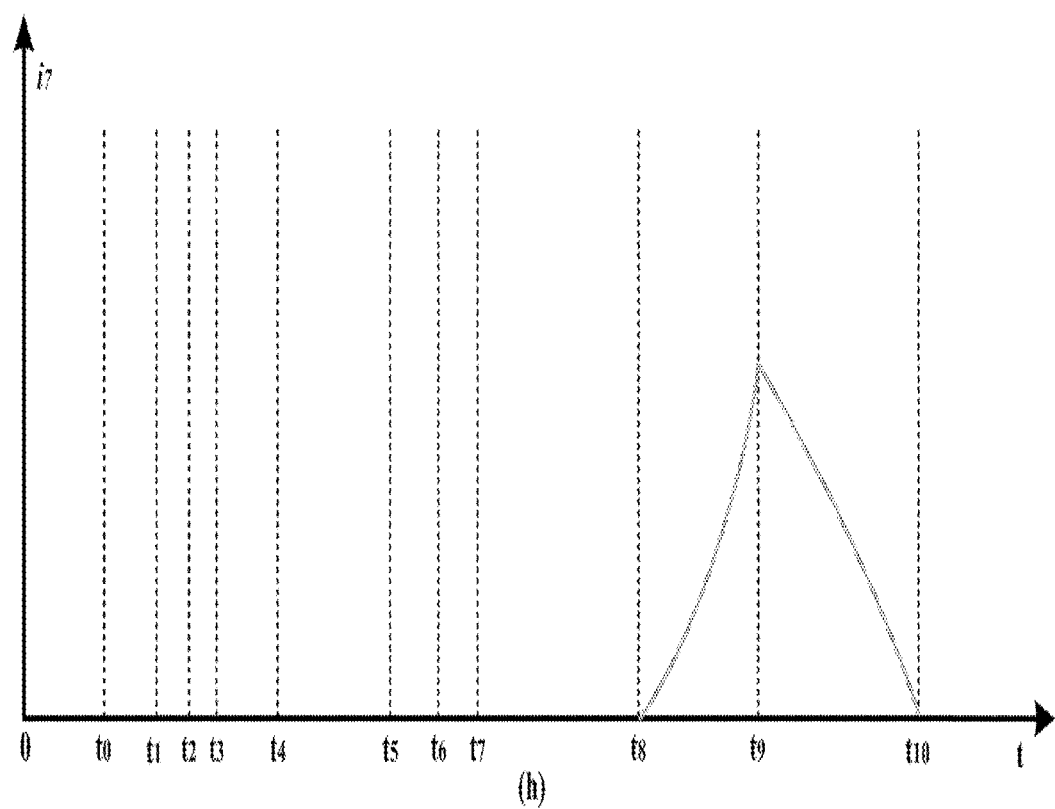
Figure 9:
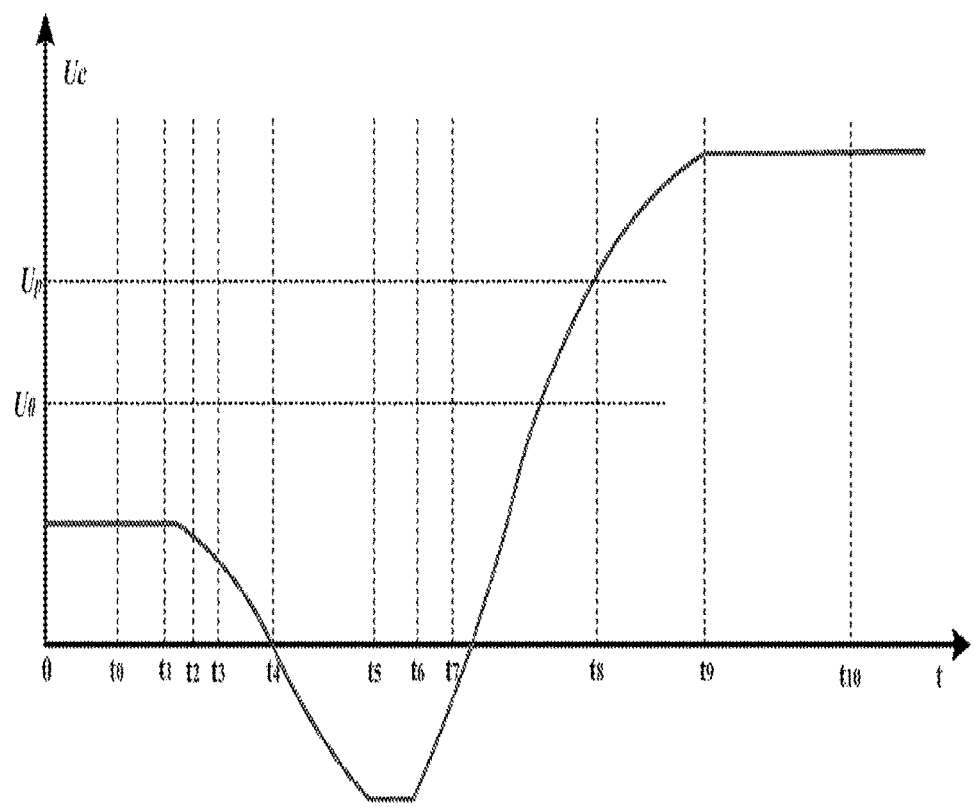
FIG. 9 is a graph of voltage of a pre-charged capacitor when the breaking current is greater than the rated current.
Figure 10:
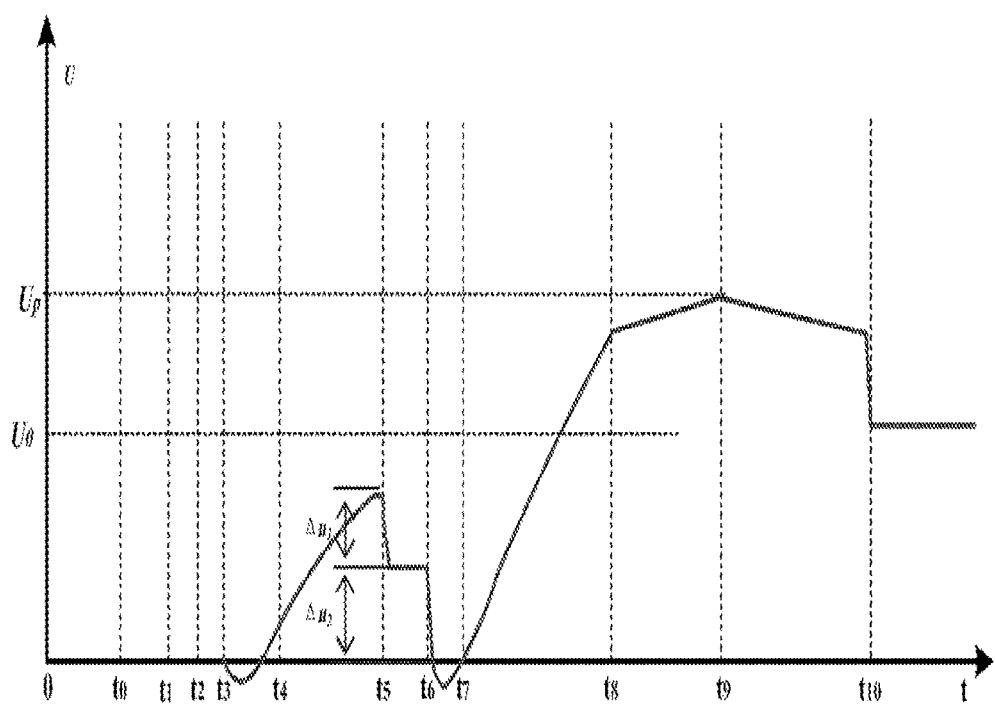
FIG. 10 is a graph of voltage at two ends of a breaker when the breaking current is greater than the rated current.

FIG. 6 shows the direction of current of all branches of the transfer current circuit when the breaking current is greater than the rated current, particularly the direction of current of all branches from t0 to t9. FIG. 7 shows a view after overlapping all current change curves when the breaking current is greater than the rated current. FIG. 8 shows a current change curve of all branches of the transfer current circuit, particularly a current change curve of all branches from i0 to i7, corresponding to FIG. 7, when the breaking current is greater than the rated current. FIG. 9 shows a curve of voltage of the pre-charged capacitor when the breaking current is greater than the rated current. FIG. 10 shows a curve of voltage at two ends of the breaker when the breaking current is greater than the rated current.

The specific operating steps comprise the following steps:

1) As shown in FIG. 7 and FIG. 8(a), before t0, the system operates normally, and current all flows through the main current circuit, as shown in FIG. 6(a), where, the rated system voltage is U0 and the rated current is a first rated current I0.

2) At t0, the system has a short-circuit fault, as a result, the current of the main current circuit starts to rise. From t0 to t1, when the current exceeds the short-circuit threshold of the system, the control system acts. As the delay time of the high-speed mechanical switch is longer than the response time of the power semiconductor devices, the high-speed mechanical switch is controlled to perform an opening action at first.

3) At t1, as shown in FIG. 6(b), the power semiconductor devices A1 and A3 are controlled to turn on. As the direction of the voltage at two ends of the pre-charged capacitor is opposite to the direction of the voltage at two ends of the main current circuit, that is, the voltage drop at two ends of the branch consisting of the power semiconductor device A1, the capacitor C, the inductor L_1 and the power semiconductor devices A3 is lower than the voltage drop at two ends of the main current circuit, the current flowing through the main current circuit starts to transfer downward, that is, i1 starts to drop and i2 starts to rise, as shown in FIG. 8(b) and FIG. 8(c).

4) At t2, as shown in FIG. 6(c), the current of the high-speed mechanical switch all transfers to the branch consisting of the power semiconductor device A1, the capacitor C, the inductor L_1 and the power semiconductor devices A3. As shown in FIG. 9, the direction of the voltage at two ends of the capacitor C is kept unchanged.

5) At t3, the contacts of the high-speed mechanical switch are opened without an electric arc, and two ends of the hybrid breaker start to have a voltage. As the direction of voltage of the capacitor C is still kept unchanged, the voltage drop at two ends of the hybrid breaker is negative. From t3 to t4, due to the presence of the inductor L_1, the voltage U at two ends of the breaker is higher that the voltage Uc on the capacitor C, that is, the direction of the voltage U at two ends of the breaker is changed prior to the change of the voltage of the capacitor C.

6) At t4, the direction of the voltage of the capacitor starts to reverse, thus the voltage at two ends of the circuit 2 is equal to the sum of the voltage drop of the power semiconductor device A1 and the voltage drop of the capacitor C. As the value of this voltage is positive, the power semiconductor device A2 is turned on. As shown in FIG. 6(d), the current starts to transfer from the circuit 1 to the circuit 2. FIG. 8(c) and FIG. 8(d) show change curves of current i2 and current i3. Then, the voltage U at two ends of the breaker continues to rise.

7) At t5, the current in the circuit 1 all transfers to the circuit 2, as shown in FIG. 6(e). The power semiconductor device A1 in the circuit 1 is turned off. At this moment, the current flowing through the capacitor C is 0, and the direction of voltage of the capacitor C is opposite to the direction of the initial pre-charged voltage. When the current of the circuit 1 is turned off, the voltage at two ends of the breaker is turned into the sum of voltages of both the transfer current circuit and the branch 23 from the sum of voltages of the circuit 1, the capacitor C and the circuit 3. Therefore, the voltage at two ends of the breaker has a voltage jump Δu1 after t5. As it takes a certain period of time to all cut off A1, the time from t5 to t6 is the reserved cut-off time for the power semiconductor device A1. FIG. 8(d), FIG. 8(e) and FIG. 8(f) show change curves of currents i3, i4 and i5.

8) At t6, the power semiconductor device A4 in the circuit 4 is turned on, as shown in FIG. 6(f). The sum of the voltage of the capacitor C and the voltage at two ends of the circuit 4 is negative, so the current in the circuit 3 starts to transfer to the capacitor C and the circuit 4. When the circuit 4 is turned on, the voltage at two ends of the breaker will be turned into the sum of voltages of the circuit 2, the capacitor C and the circuit 4 from the sum of voltages of both the transfer current circuit and the branch 23, so there is a voltage jump Δu2. As the direction of current flowing through the capacitor C is opposite, the voltage of the capacitor starts to rise forward. FIG. 8(d), FIG. 8(e), FIG. 8(f) and FIG. 8(g) show change curves of currents i3, i4, i5 and i6.

9) At t7, the current in the circuit 3 all transfers to the capacitor C and the circuit 4, as shown in FIG. 6(g). Then, the circuit 4 is turned off without current, and the voltage of the capacitor C continues to rise forward due to charging. Within a certain period of time after t7, the direction of the voltage will change. With the rise of the charging voltage of the capacitor, the current in the breaking process reaches a peak Ip when the voltage at two ends of the breaker reaches the system voltage U0. Then, the system current starts to drop as the voltage at two ends of the breaker is higher that the system voltage.

10) At t8, the sum of voltages of the circuit 2, the capacitor C and the circuit 4 (the voltage at two ends of the breaker) reaches the turn-on threshold of the over-voltage limiting circuit, so the over-voltage limiting circuit is turned on. As shown in FIG. 6(h), the current starts to transfer to the over-voltage limiting circuit. At this moment, the current of the capacitor C decreases, but the capacitor C is still in the state of charging. Therefore, the voltage of the capacitor C and the voltage at two ends of the breaker continue to rise. However, the rise range is very small because of the voltage clamp action of the over-voltage limiting circuit. FIG. 8(g) and FIG. 8(h) show change curves of currents i6 and i7.

11) At t9, all the current in the circuit 2, the capacitor and the circuit 4 all transfers to the over-voltage limiting circuit. At this moment, the voltage of the capacitor C and the voltage at two ends of the breaker reach a highest value, where, Up is a peak of the over-voltage at two ends of the breaker in the breaking process. As the voltages of the circuit 2 and the circuit 4 mainly depend on the voltage of the inductor L_0, and the current of the inductor L_0 is opposite to the current on the voltage Uc of the capacitor C during the drop of current, the peak of the voltage Uc of the capacitor C is higher than the peak Up of the voltage at two ends of the breaker. In addition, as the system current is dropping, the current in the over-voltage limiting circuit starts to drop, and the voltage at two ends of the breaker also starts to drop slowly. When the system current is less than the minimal turn-on current 1 mA of the over-voltage limiting circuit, the over-voltage limiting circuit is turned off, and the voltage at two ends of the over-voltage limiting circuit drops rapidly.

12) At t10, the current in the over-voltage limiting circuit is 0, the breaking of the breaker is completed, and the voltage at two ends of the breaker drops to the system voltage. FIG. 8(a) shows a change curve of the system current during the whole breaking process.

From the above breaking process, it can be found that the non-arc opening of the mechanical contacts is realized by connecting the high-speed mechanical switch with the power semiconductor devices in series, the medium between the contacts has good recovery property, and the breaker has a strong breaking over-voltage withstand capacity. Meanwhile, the breaker basically realizes breaking by turning the over-voltage limiting circuit on via the charging voltage of the capacitor C, and may limit the rate of rise of the voltage in the breaking process by controlling the direction of current on the capacitor C. FIG. 9 and FIG. 10 show a curve of the voltage of the pre-charged capacitor and a curve of the voltage at two ends of the breaker when the breaking current is greater than the rated current, respectively. Referring to FIG. 9 and FIG. 10, two drop processes Δu1 and Δu2 of the voltage at two ends of the breaker limit the rise of the voltage at two ends of the breaker, thus providing a certain period of time for the motion of the contacts of the high-speed mechanical switch, and avoiding the restrike of the mechanical switch. As the direction of the voltage of the capacitor C is changed two times in the breaking process, the direction of the voltage of the capacitor C is consistent to the direction of the pre-charged voltage at the end of breaking, thus the charging of the capacitor C is avoided in the next time of breaking.

Figure 11:
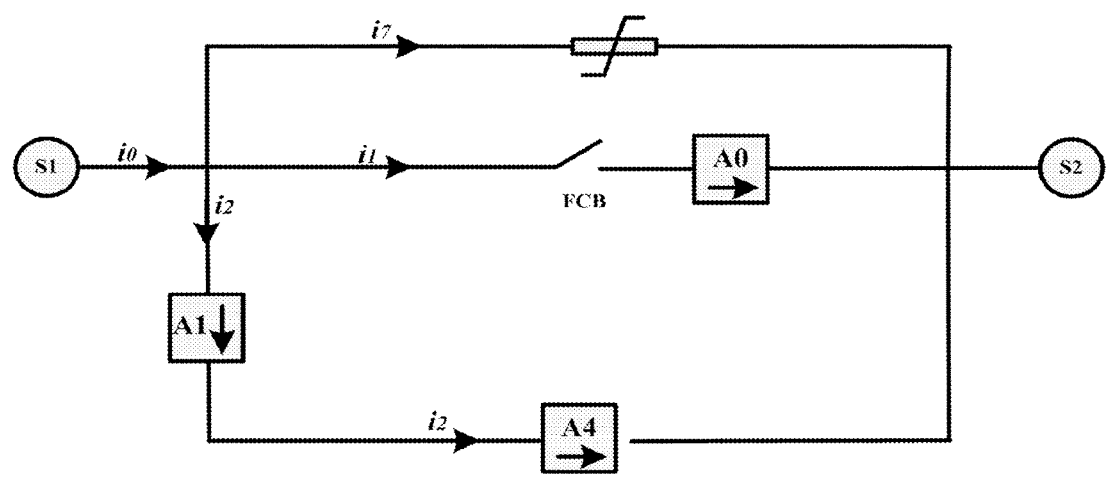
FIG. 11 is a schematic diagram of current flags of the transfer current circuit when the breaking current is less than or equal to the rated current.

(2) In the Case that the Breaking Current is Less than or Equal to the Rated Current FIG. 11 shows current flags of all branches of the transfer current circuit when the breaking current is less than or equal to the rated current, where, i0 is the current flowing through the access terminal S1 or S2, i1 is the current flowing through the main current circuit, i2 is the current flowing through the circuit 1, and i7 is the current flowing through the over-voltage limiting circuit.

Figure 12:
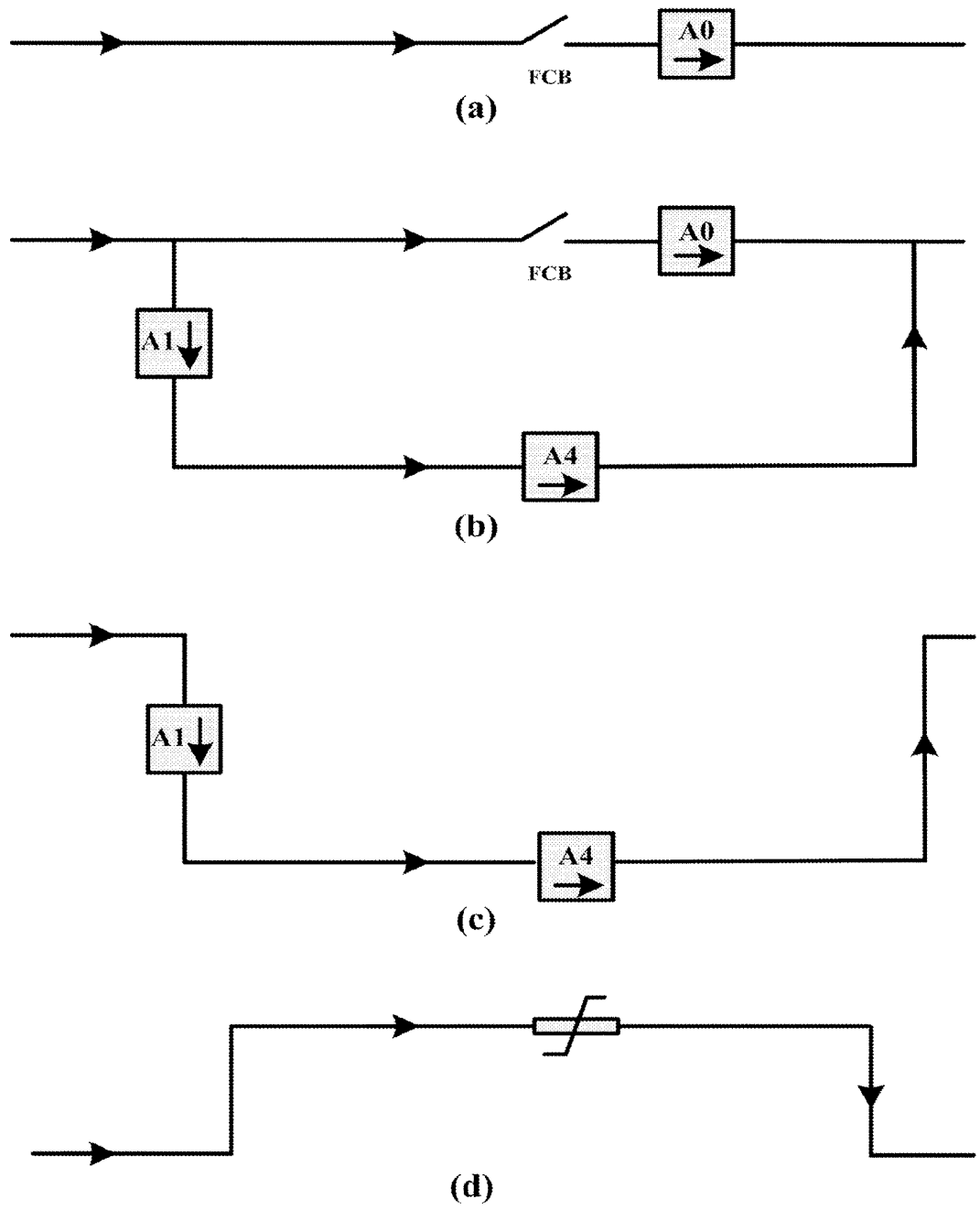
Figure 13:
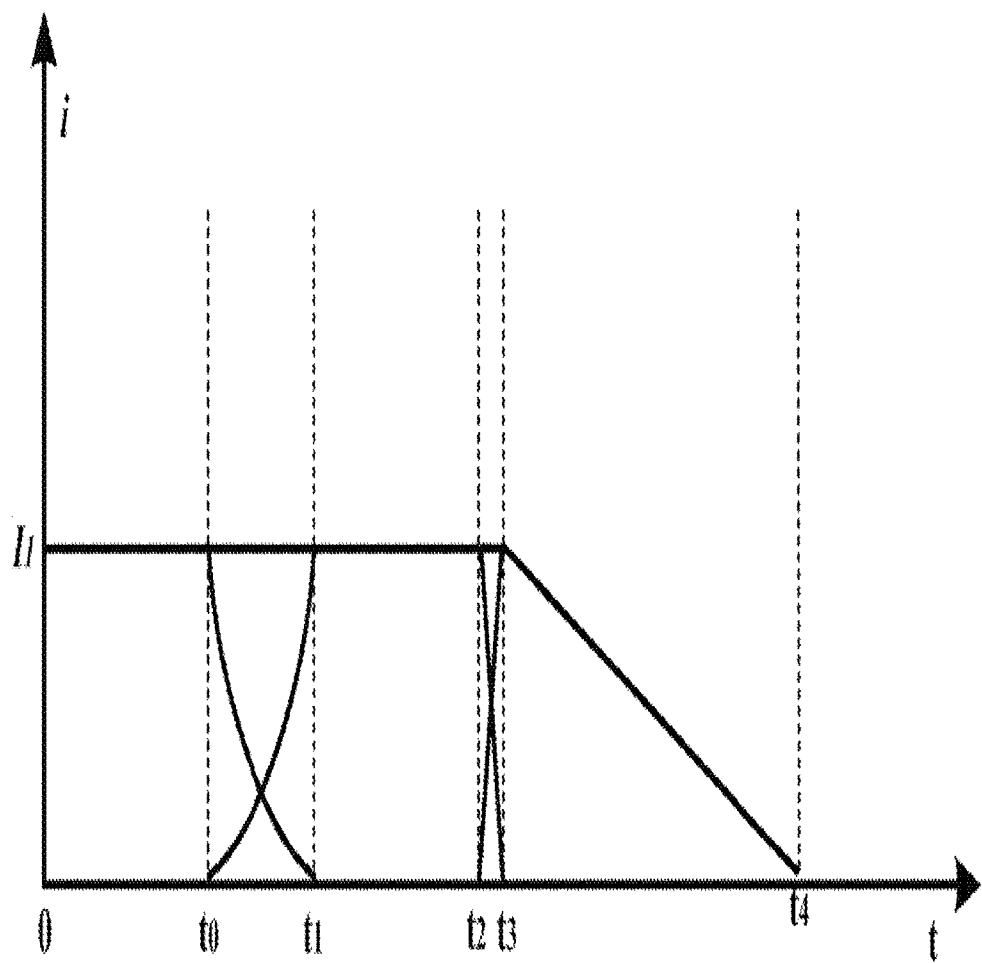
FIG. 13 is a view after overlapping all current change curves when the breaking current is less than or equal to the rated current.
Figure 14:
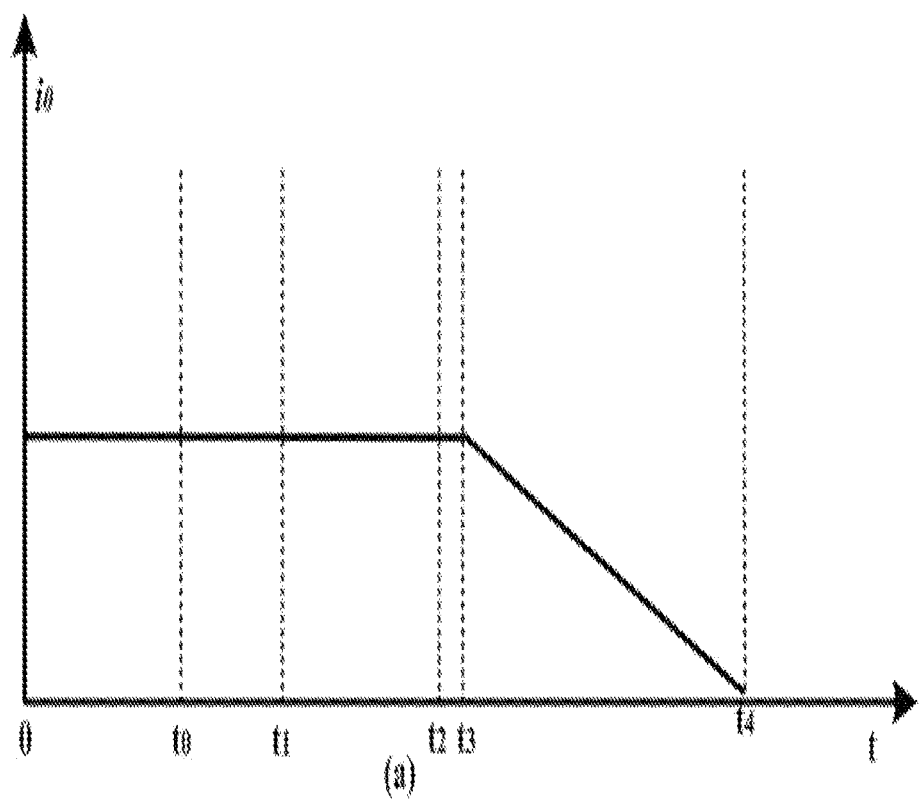
FIG. 14 (a) to FIG. 14 (d) is a current change graph of the transfer current circuit, corresponding to FIG. 13, when the breaking current is less than or equal to the rated current.
Figure 14:
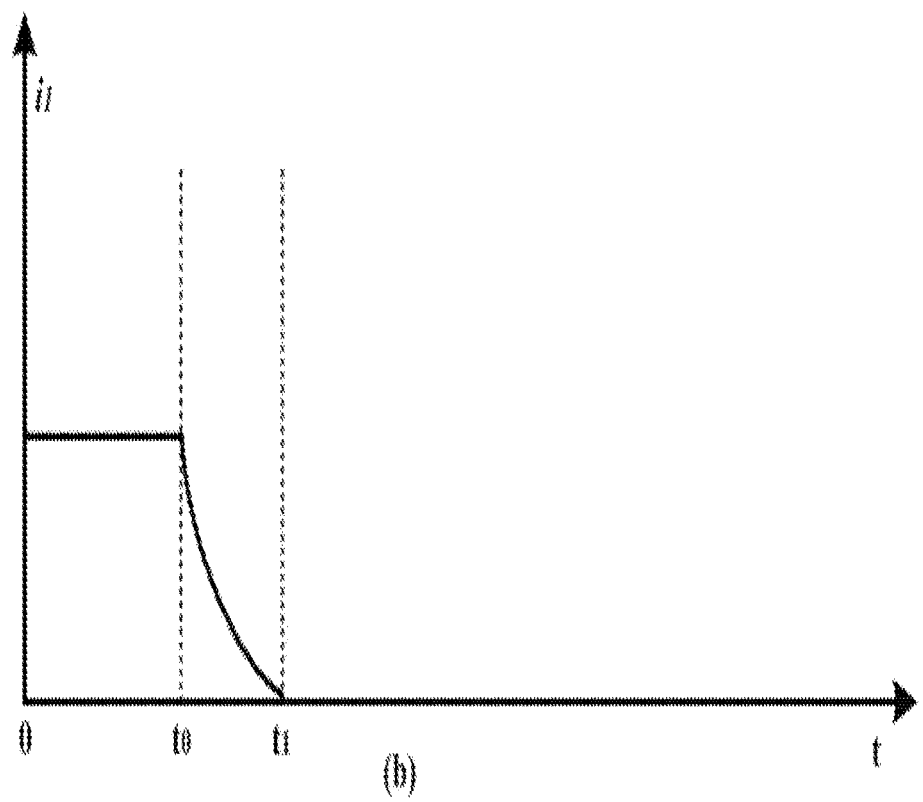
Figure 14:
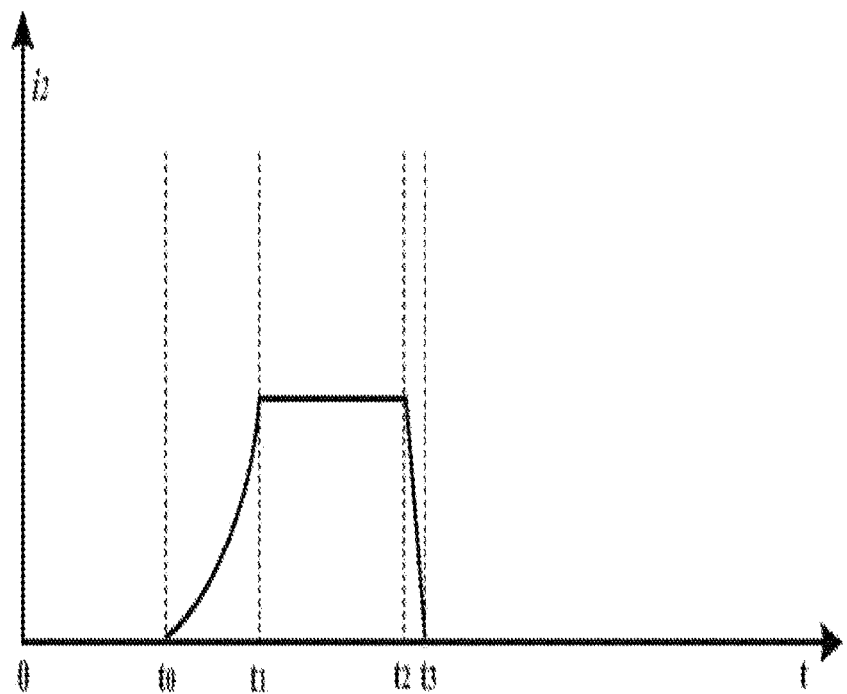
Figure 14:
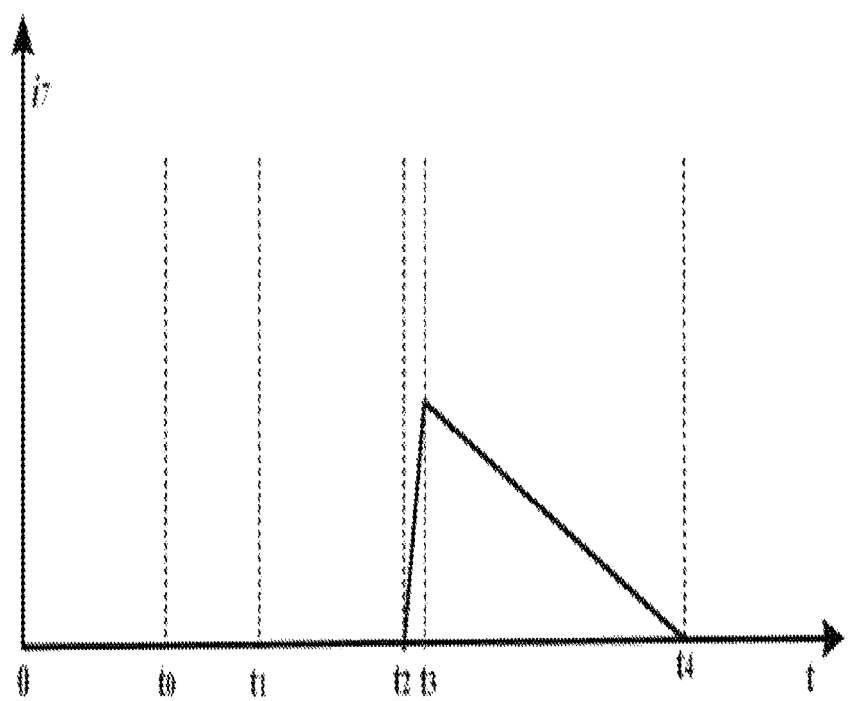
Figure 15:
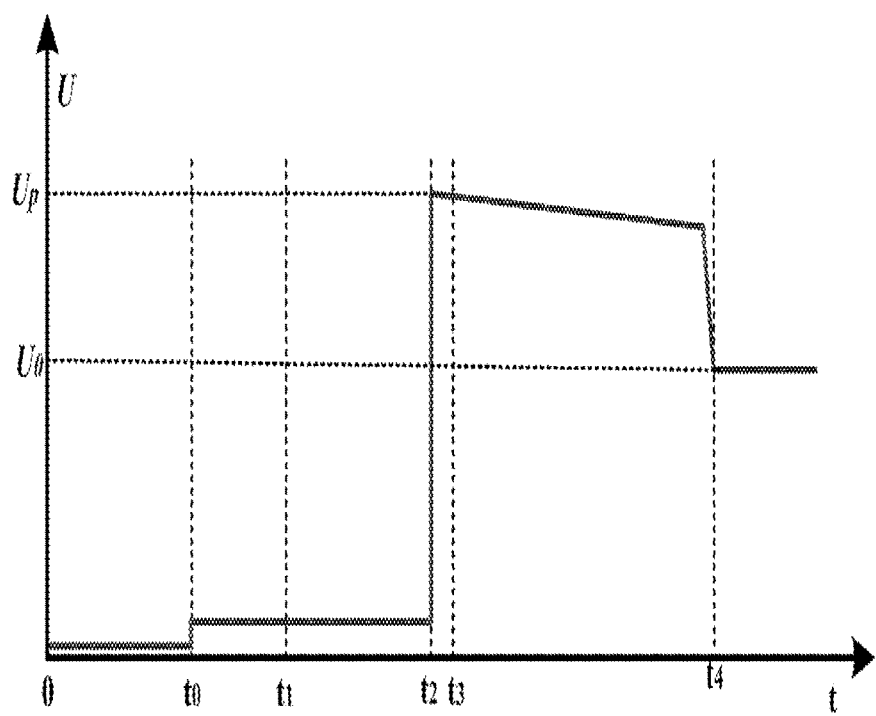
FIG. 15 is a graph of voltage of at two ends of the breaker when the breaking current is less than or equal to the rated current.

FIG. 12 shows the direction of current of all branches of the transfer current circuit when the breaking current is less than or equal to the rated current, particularly the direction of current of all branches at each moment. FIG. 13 shows a diagram after overlapping all current change curves when the breaking current is less than or equal to the rated current. FIG. 14 shows the current change curve of the transfer current circuit, particularly the current change curve of all branches i0, i1, i2 and i7, corresponding to FIG. 13 when the breaking current is less than or equal to the rated current. FIG. 15 shows the change of voltage at two ends of each breaker module when the breaking current is less than or equal to the rated current.

In this case, the breaker may break according to the case that the breaking current is greater than the rated current, but the time for charging discharging the capacitor is relatively long in the case that the breaking current is less than the rated current. Therefore, the time required by the whole breaking process is relatively long. The present invention also provides another breaking way. The specific operating steps of this breaking way comprise the following steps:

1) Before t0, the system operates normally and the current all flows through the main current circuit, as shown in FIG. 12(a). The rated system voltage is U0, and the system current is a second rated current I1 (the second rated current I1 is less than or equal to the first rated current I0). When in need of breaking, the high-speed mechanical switch is controlled to perform an opening action at first.

2) At t0, the contacts of the high-speed mechanical switch start to open to generate an electric arc. The power semiconductor devices in the branch 14 of the transfer current circuit are controlled to open, and the current starts to transfer downward, as shown in FIG. 12(b). With the opening of the contacts of the high-speed mechanical switch, the voltage at two ends of the breaker becomes an arc voltage.

As the arc voltage is higher than the sum of voltage at two ends of the branch 14 of the transfer current circuit, the current in the high-speed mechanical switch rapidly transfers to the branch 14 of the transfer current circuit. FIG. 14(b) and FIG. 14(c) show change curves of i1 and i2.

3) At t1, the current in the high-speed mechanical switch all transfers to the branch 14 of the transfer current circuit, as shown in FIG. 12(c). Then, the contacts of the high-speed mechanical switch continue to move, in order to obtain a spacing large enough to withstand an over-voltage generated in the breaking process.

4) At t2, the spacing between the contacts of the high-speed mechanical switch can withstand an over-voltage generated in the breaking process. The full-controlled device A4 in the circuit 4 is controlled to turn off. The voltage at two ends of the breaker rises sharply to reach the turn-on threshold of the over-voltage limiting circuit. The current in the branch 14 of the transfer current circuit starts to transfer to the over-voltage limiting circuit. As shown in FIG. 12(c), the peak of the over-voltage at two ends of the breaker in the breaking process is Up. Then, the system current starts to drop. The voltage at two ends of the breaker also drops somewhat as the current of the over-voltage limiting circuit drops. FIG. 14(c) and FIG. 14(d) show change curves of i2 and i7. When the system current is less than the minimal turn-on current 1 mA of the over-voltage limiting circuit, the voltage at two ends of the over-voltage limiting circuit rapidly drops.

5) At t3, the current of the over-voltage limiting circuit drops to 0, and the voltage at two ends of the breaker drops to the system voltage, thus the whole breaking process is completed.

Figure 16:
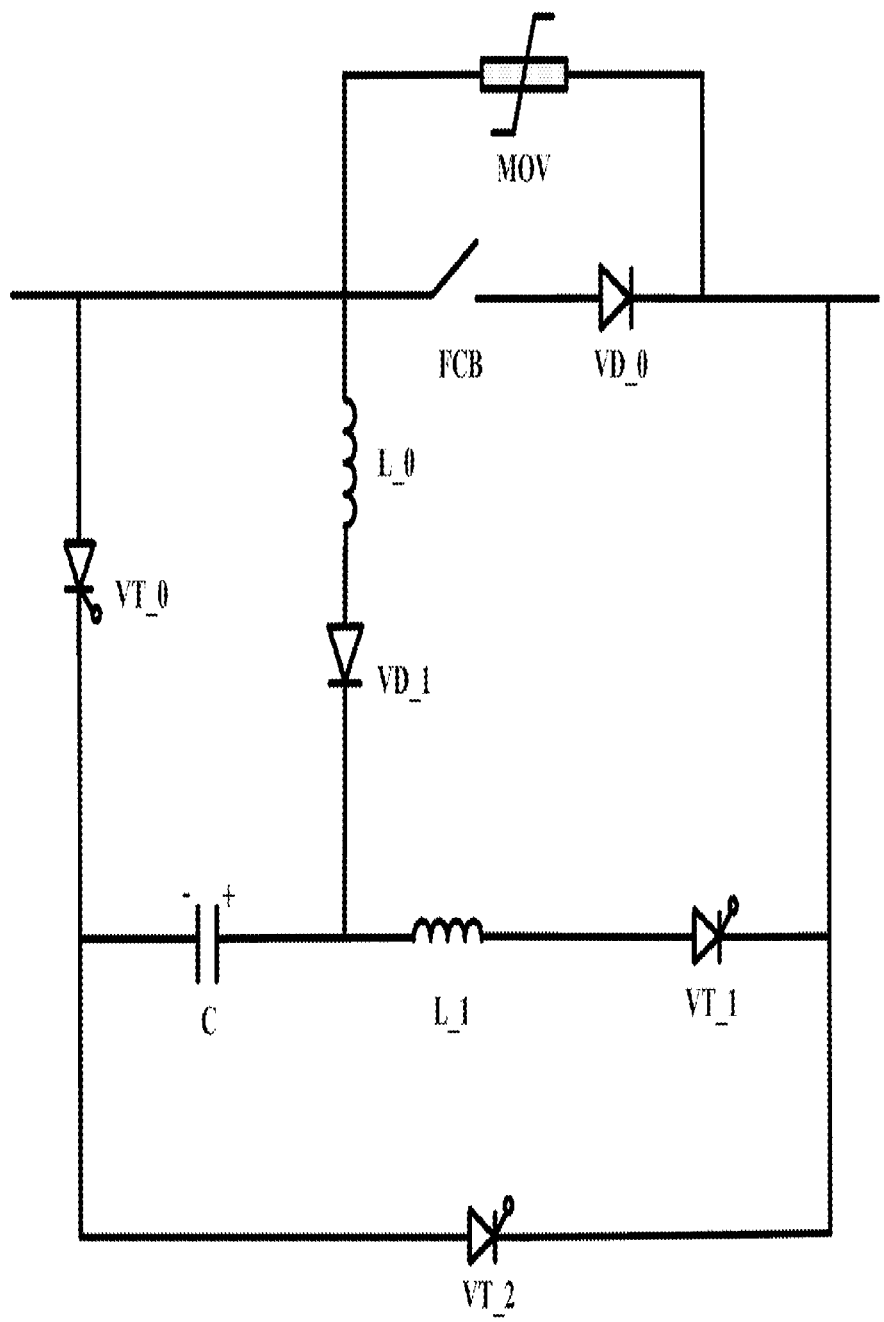
FIG. 16 is a diagram of a specific embodiment of the present invention.
Figure 17:
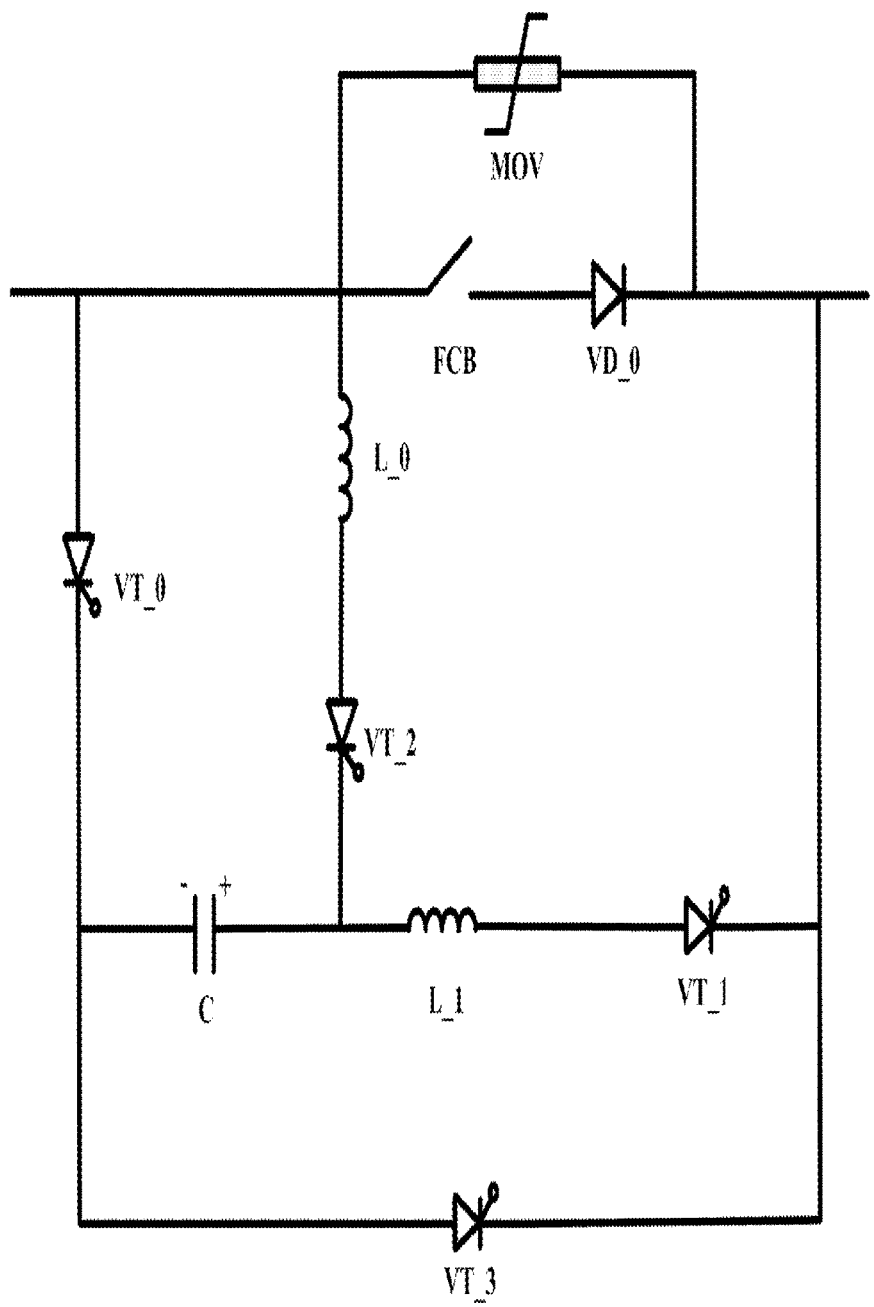
FIG. 17 is a diagram of a specific embodiment of the present invention.
Figure 18:
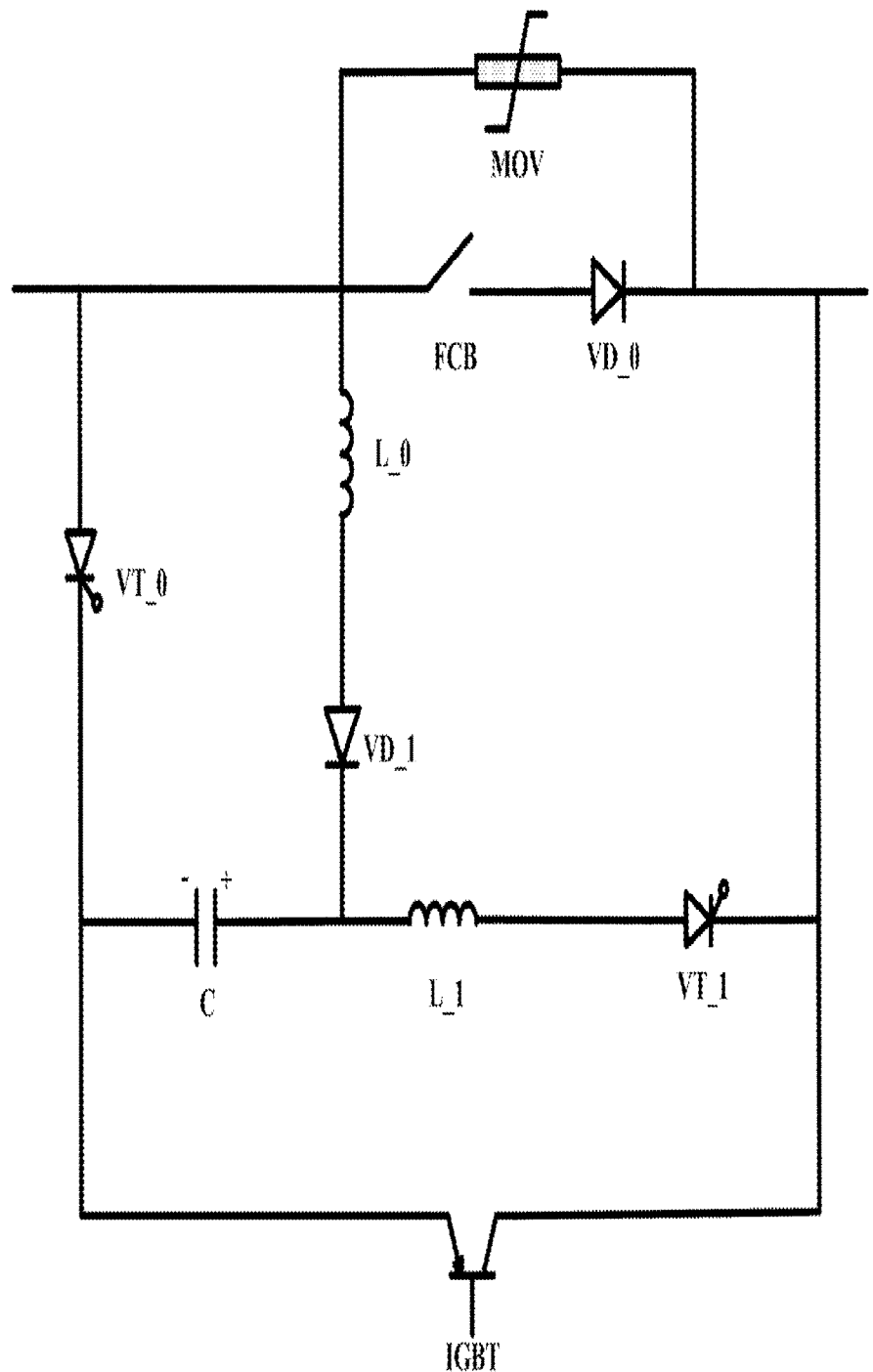
FIG. 18 is a diagram of a specific embodiment of the present invention.

The present invention includes, but is not limited to, the two breaking ways as described above. FIG. 16, FIG. 17 and FIG. 18 show more specific embodiments of the present invention, respectively. In FIG. 16, as there is no any full-controlled device in the transfer current circuit, the cost is low and the reliability of the devices is high; however, a long time is required for breaking in the case of breaking at a low current. In FIG. 17, as a half-controlled device is used in the circuit 2 as A2, controlling the turn-on time of A1 in the breaking process can change the transfer time of the current from the circuit 1 to the circuit 2; as there is no any full-controlled device, the cost is low; however, a long time is required for breaking in the case of breaking at a low current. In FIG. 18, as a full-controlled device is used in the circuit 4 as A4, when the current in the circuit 4 is less than the turn-off current of A4 in the breaking process, A4 may be controlled to turn off to further shorten the breaking time of the breaker.

Therefore, it is to be recognized that all power semiconductor devices in the present invention may be full-controlled devices. However, according to different breaking ways, A0-A4 might need to be half-controlled or full-controlled devices.

FIG. 19 shows a structure of the control system of the present invention. The control system comprises:

a current sensor T0 for measuring the current flowing through the access terminal S1 or S2, a current sensor T1 for measuring the current flowing through the main current circuit, a current sensor T2 for measuring the current flowing through the circuit 1 in the transfer current circuit, a current sensor T3 for measuring the current flowing through the over-voltage limiting circuit, a sensor V for measuring the voltage at two ends of the high-speed mechanical switch, and a sensor P for measuring the displacement of the high-speed mechanical switch, as well as a signal conditioning circuit, a high-speed AD, a processor and a human-computer interface. The numerical values of the system current, the current of the main current circuit, the current of the circuit 1, the current of the over-voltage limit circuit, the voltage of the high-speed mechanical switch and the displacement of the high-speed mechanical switch are filtered and amplified, and then processed and calculated by the AD. The calculation includes, but is not limited to, calculating the amplitude and rate of change di/dt of the current flowing through the main current circuit and the circuit 1. After the protection algorithm and delay control by the processor, the control to the high-speed mechanical switch and the control to the power semiconductor devices are performed. The human-computer interface displays the state of the hybrid DC breaker and the results of various calculations in real time.

It should be recognized that:

the high-speed mechanical switch is a high-speed mechanical switch based on electromagnetic repulsion, a mechanical switch driven by a high-speed motor or a high-speed mechanical switch driven by explosion.

The power semiconductor devices with a half-controlled function include any one or combinations of more of a transistor, an IGCT, an IGBT and a GTO.

The over-voltage limiting circuit comprises a varistor and auxiliary circuits thereof.

The over-voltage limiting circuit comprises an MOV consisting of zinc oxide varistors or an arrester.

The present invention discloses a hybrid DC breaker, comprising a main current circuit, a transfer current circuit, an over-voltage limiting circuit and a control system. The transfer current circuit comprises a pre-charged capacitor, inductors and power semiconductor devices. When the breaking current of the breaker is greater than or equal to the rated current of the breaker, by controlling the power semiconductor devices in the transfer current circuit to act according to a certain timing sequence, the contacts of the high-speed mechanical switch may be opened without an electric arc, and the direction of current of the pre-charged capacitor may be changed, further, the direction of voltage at two ends of the pre-charged capacitor is changed to limit the rate of rise of the breaking over-voltage at two ends of the breaker. As the high-speed mechanical switch is opened without an electric arc and the medium between the contacts has a good recovery property, in combination with the limitation of the transfer current circuit to the breaking over-voltage, the reliability of breaking can be improved significantly. When the breaking current of the breaker is less than the rated current of the breaker, the hybrid DC breaker provided by the present invention may also break according to the case that the breaking current of the breaker is greater than or equal to the rated current thereof. However, the time for charging discharging the capacitor is relatively long in the case that the breaking current is less than the rated current. Therefore, the present invention may provide another breaking way: the power semiconductor devices in the transfer current circuit are controlled to turn on at first to make the current rapidly transfer to the power semiconductor devices after the switch is turned on; and when the spacing between the contacts of the high-speed mechanical switch can withstand and recover an over-voltage, the current in the transfer current circuit is cut off by the power semiconductor devices with a gate-turn-off function so as to realize the breaking. As the direction of the voltage on the pre-charged capacitor is kept unchanged after the breaker breaks, breaking may be repeated after the pre-charged capacitor is charged for the first time. Therefore, the means for charging the capacitor is omitted.

The foregoing is further description of the present invention in details by specific preferred implementation ways, and the specific implementation ways of the present invention shall not be regarded to be limited thereto. For a person of ordinary skill in the art should understand that, the present invention may have various simple deductions or replacements, and these deductions or replacements should be considered to fall into the protection scope of the present invention defined by the appended claims.

What is claimed is:

1. A hybrid DC breaker, comprising a main current circuit, a transfer current circuit, an over-voltage limiting circuit, a control system, and an first access terminal and an second access terminal of the system, the main current circuit, the transfer current circuit and the over-voltage limiting circuit being connected in parallel, wherein:
  (1) the main current circuit consists of a high-speed mechanical switch and a first power semiconductor device, which are connected in series, wherein: the first access terminal is connected with one end of the high-speed mechanical switch to realize the connection of the first access terminal with one end of the main current circuit; the other end of the high-speed mechanical switch is connected with one end of the first power semiconductor device; and the other end of the first power semiconductor device is connected with the second access terminal to realize the connection of the second access terminal with the other end of the main current circuit;
  (2) the transfer current circuit comprises a first circuit consisting of a second power semiconductor device, a second circuit consisting of an first inductor and a third power semiconductor device connected in series, a third circuit consisting of an second inductor and a fourth power semiconductor device connected in series, a fourth circuit consisting of a fifth power semiconductor device, and a pre-charged capacitor pre-charged with a certain voltage, the first circuit being connected with the fourth circuit in series, the second circuit being connected with the third circuit in series, wherein:
  (A) the first circuit is connected with the fourth circuit in series to form a first branch of the transfer current circuit, and the first branch is connected with the main current circuit in parallel, furthermore: the first access terminal is connected with one end of the second power semiconductor device to realize the connection with one end of the first branch; the other end of the second power semiconductor device is connected with one end of the fifth power semiconductor device to realize the connection in series of the first circuit with the fourth circuit; and the other end of the fifth power semiconductor device is connected with the second access terminal to realize the connection of the other end of the first branch with the second access terminal, in order to realize the connection in parallel of the first branch with the main current circuit;
  (B) the second circuit is connected with the third circuit in series to form a second branch of the transfer current circuit, and the second branch is connected with the main current circuit in parallel, furthermore: the first access terminal is connected with one end of the first inductor to realize connection with one end of the second branch; the other end of the first inductor is connected with one end of the third power semiconductor device; the other end of the third power semiconductor device is connected with one end of the second inductor to realize the connection in series of the second circuit with the third circuit; the other end of the second inductor is connected with one end of the fourth power semiconductor device; and the other end of the fourth power semiconductor device is connected with the second access terminal to realize the connection of the other end of the second branch with the second access terminal, in order to realize the connection in parallel of the second branch with the main current circuit; and
  (C) the pre-charged capacitor is connected between an endpoint between the first circuit and the fourth circuit and an endpoint between the second circuit and the third circuit; and
  (3) the control system measures the current flowing through the first or second access terminal, the current flowing through the main current circuit, the current flowing through the first circuit in the transfer current circuit, the current flowing through the over-voltage limiting circuit, the voltage at two ends of the high-speed mechanical switch and the displacement of the high-speed mechanical switch, and controls the high-speed mechanical switch and the second, third, fourth and fifth power semiconductor devices in the transfer current circuit to act by measuring the current amplitude and current rate of change of the main current circuit and the current amplitude and current rate of change of the first circuit in the transfer current circuit.

2. The breaker according to claim 1, wherein: in a normal operating state, current flows through the main current circuit, and the pre-charged capacitor is pre-charged with a certain voltage, the direction of the voltage being opposite to the direction of a turn-on voltage drop of the main current circuit; at this moment, the first, second, third, and fourth circuits in the transfer current circuit are all turned off, so that no current flows through the transfer current circuit and also no current flows through the over-voltage limiting circuit; and when the system needs to break, the control system first controls the high-speed mechanical switch in the main current circuit to perform an opening action, however, at this moment, the contact of the high-speed mechanical switch is still closed as the high-speed mechanical switch has a mechanical time delay; and then, the control system determines whether the second, third, fourth and fifth power semiconductor devices in the transfer current circuit to act or not and a corresponding timing sequence for action by measuring the current amplitude and current rate of change of the main current circuit and the current amplitude and current rate of change of the first circuit in the transfer current circuit.

3. The breaker according to claim 1, wherein the control system comprises a first current sensor for measuring the current flowing through the first or second access terminal, a second current sensor for measuring the current flowing through the main current circuit, a third current sensor for measuring the current flowing through the first circuit in the transfer current circuit, a fourth current sensor for measuring the current flowing through the over-voltage limiting circuit, a first sensor for measuring the voltage at two ends of the high-speed mechanical switch, and a second sensor for measuring the displacement of the high-speed mechanical switch, as well as a signal conditioning circuit, a high-speed AD, a processor and a human-computer interface, the processor calculating the amplitude and rate of change di/dt of the current flowing through the system, the main current circuit and the first circuit, the human-computer interface displaying the state of the hybrid DC breaker and the results of calculation in real time.

4. The breaker according to claim 1, wherein the high-speed mechanical switch is a high-speed mechanical switch based on electromagnetic repulsion, a mechanical switch driven by a high-speed motor or a high-speed mechanical switch driven by explosion.

5. The breaker according to claim 2, wherein the first and third power semiconductor devices are power semiconductor devices with a single-way turn-on function or combinations thereof; and, the second, fourth, and fifth power semiconductor devices are power semiconductor devices with a single-way turn-on function and a half-controlled function or combinations thereof, and the power semiconductor devices with a half-controlled function include, but are not limited to, any one or combinations of more of a transistor, an IGCT, an IGBT and a GTO.

6. The breaker according to claim 4, wherein, according to different breaking ways of breakers, one or more of the first, second, third, fourth, and fifth power semiconductor devices are full-controlled devices.

7. The breaker according to claim 6, wherein: the over-voltage limiting circuit is turned-off in the case that the breaker operates normally, the leakage current being less than 1 µA; and the turn-on voltage threshold of the over-voltage limiting circuit is 1.5 times of the voltage of the system with the breaker.

8. The breaker according to claim 7, wherein the over-voltage limiting circuit comprises one or combinations of more of a varistor, an MOV consisting of zinc oxide varistors, or an arrester.

9. The breaker according to claim 7, wherein the over-voltage limiting circuit further comprise capacity of the over-voltage limiting circuit, turn-on voltage threshold, current when the turn-on voltage is reached, the highest clamp voltage, and current when the highest clamp voltage is reached.

* * * * *